INVENTOR

Dec. 29, 1936.  O. G. SIMMONS  2,065,950
METHOD OF AND APPARATUS FOR GENERATING CURVED
SURFACES ON GEAR SHAPED CUTTERS AND THE LIKE
Filed Oct. 22, 1932  18 Sheets-Sheet 6

INVENTOR
Oliver G. Simmons

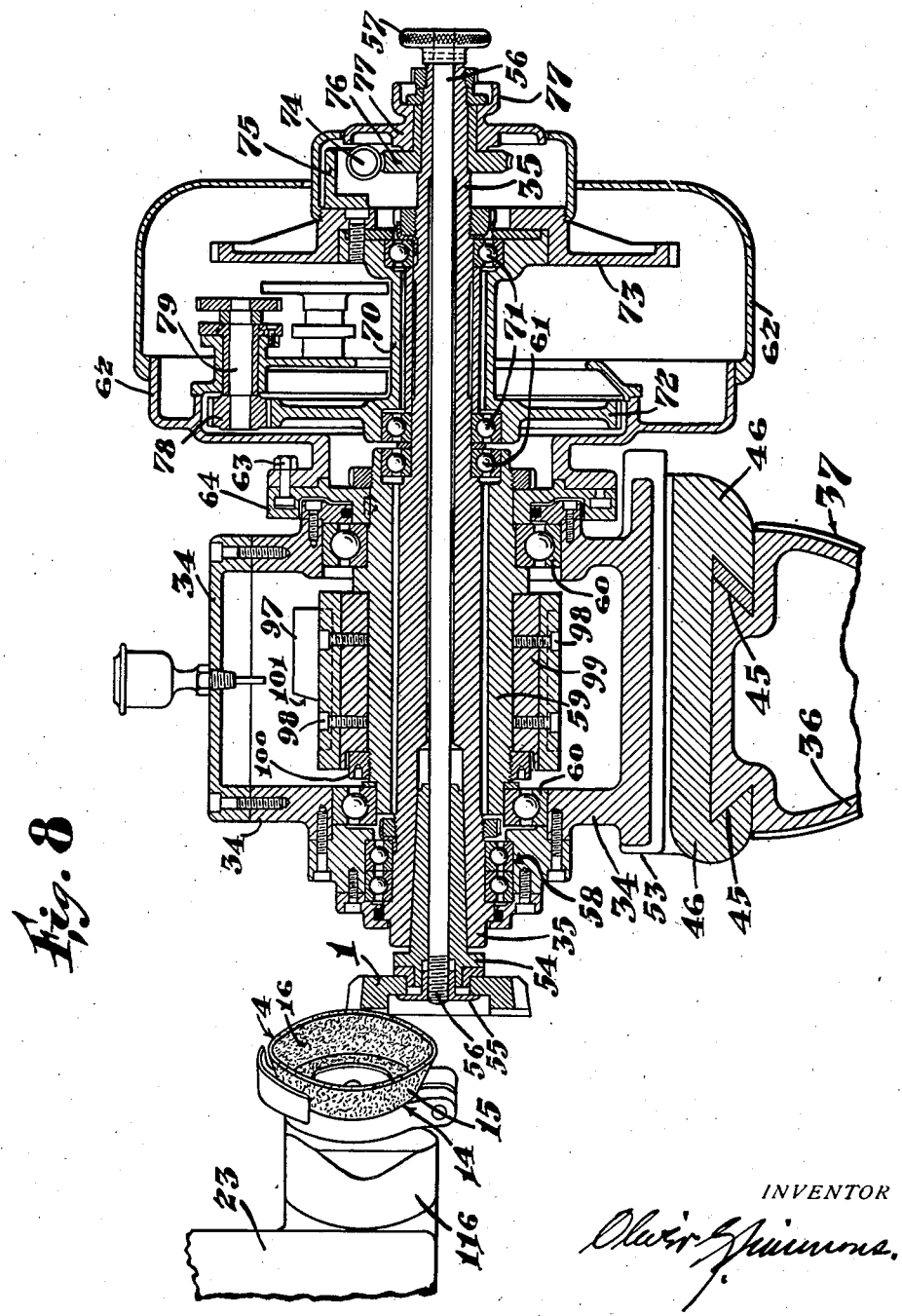

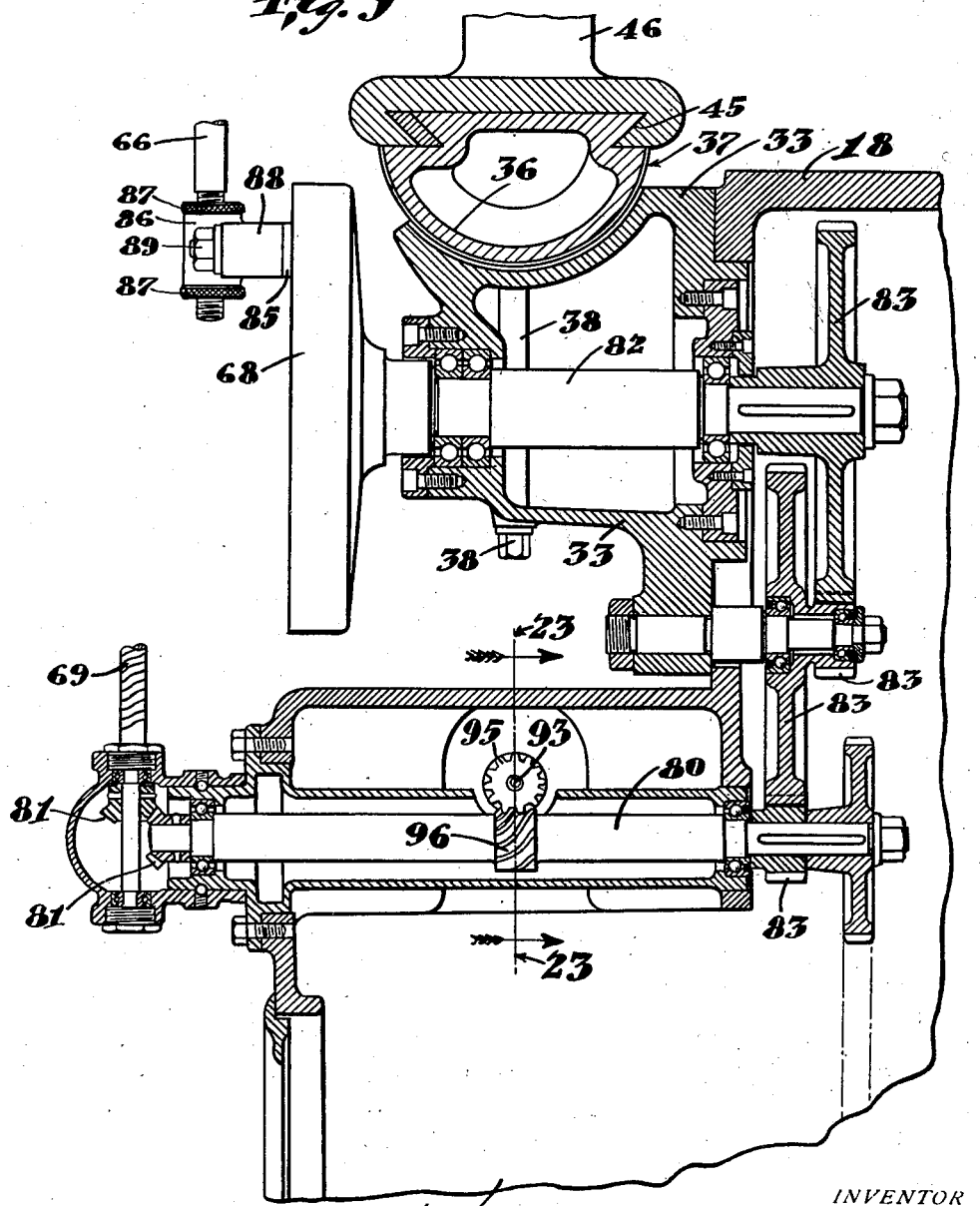

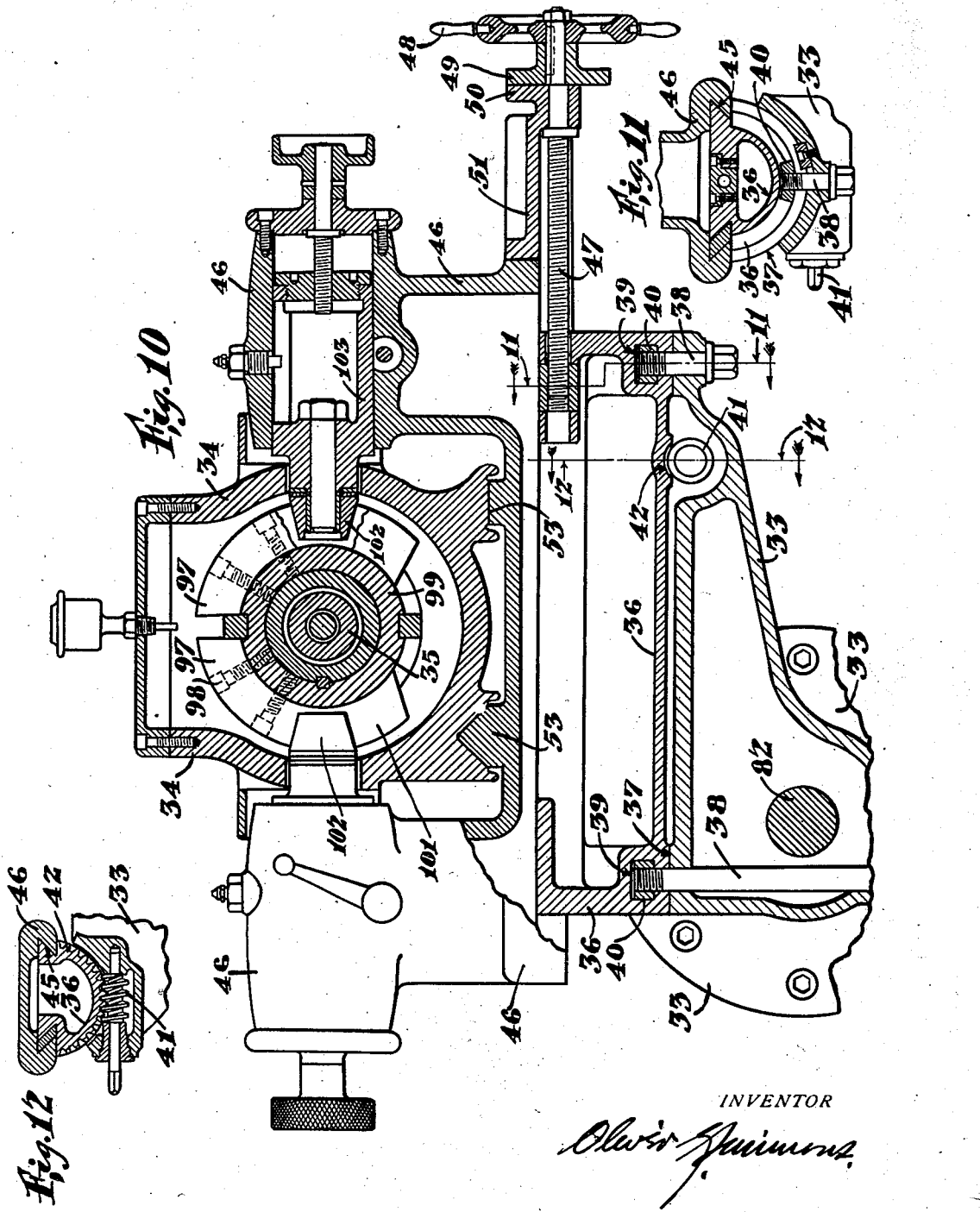

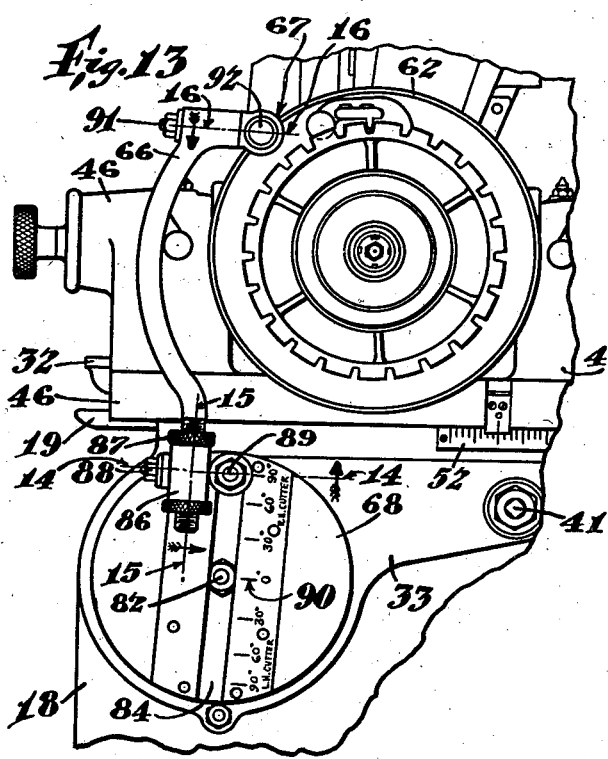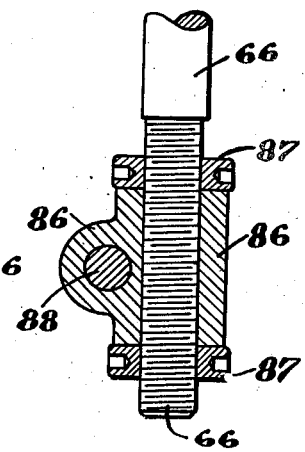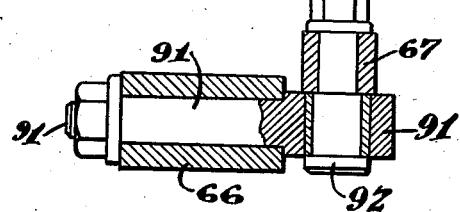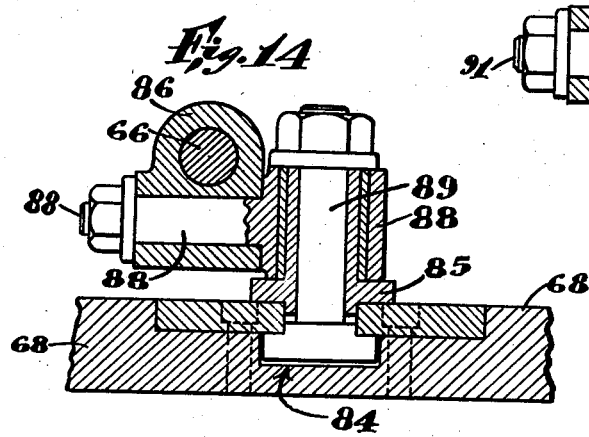

Dec. 29, 1936. O. G. SIMMONS 2,065,950
METHOD OF AND APPARATUS FOR GENERATING CURVED
SURFACES ON GEAR SHAPED CUTTERS AND THE LIKE
Filed Oct. 22, 1932 18 Sheets-Sheet 11
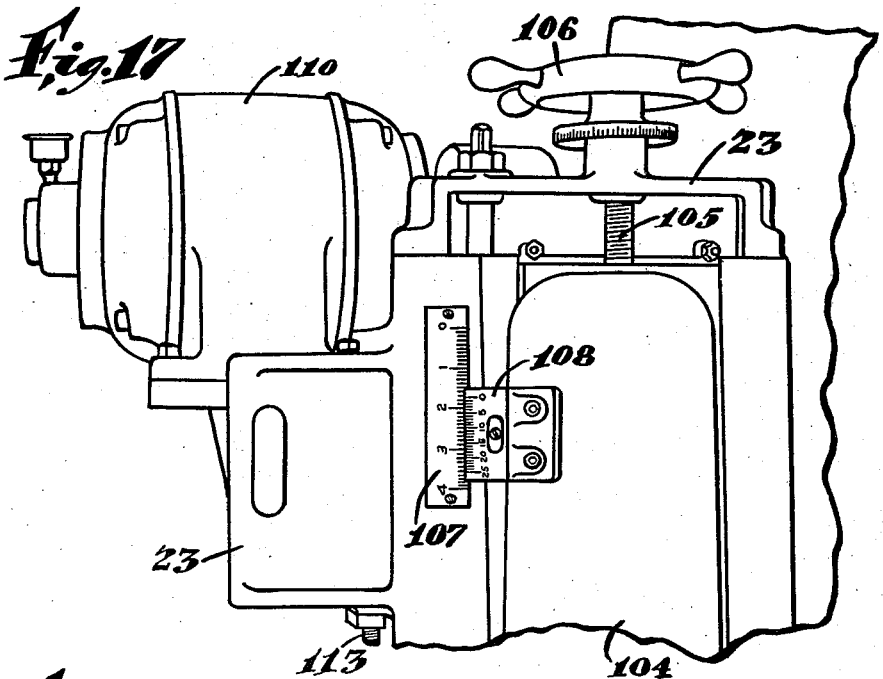
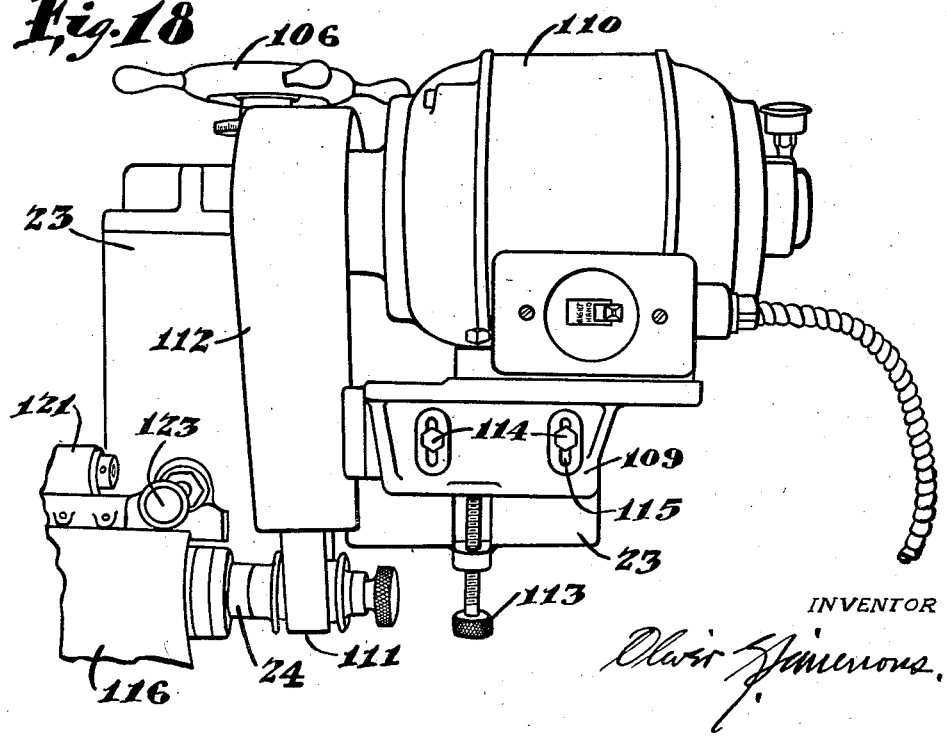
INVENTOR
Oliver G. Simmons.

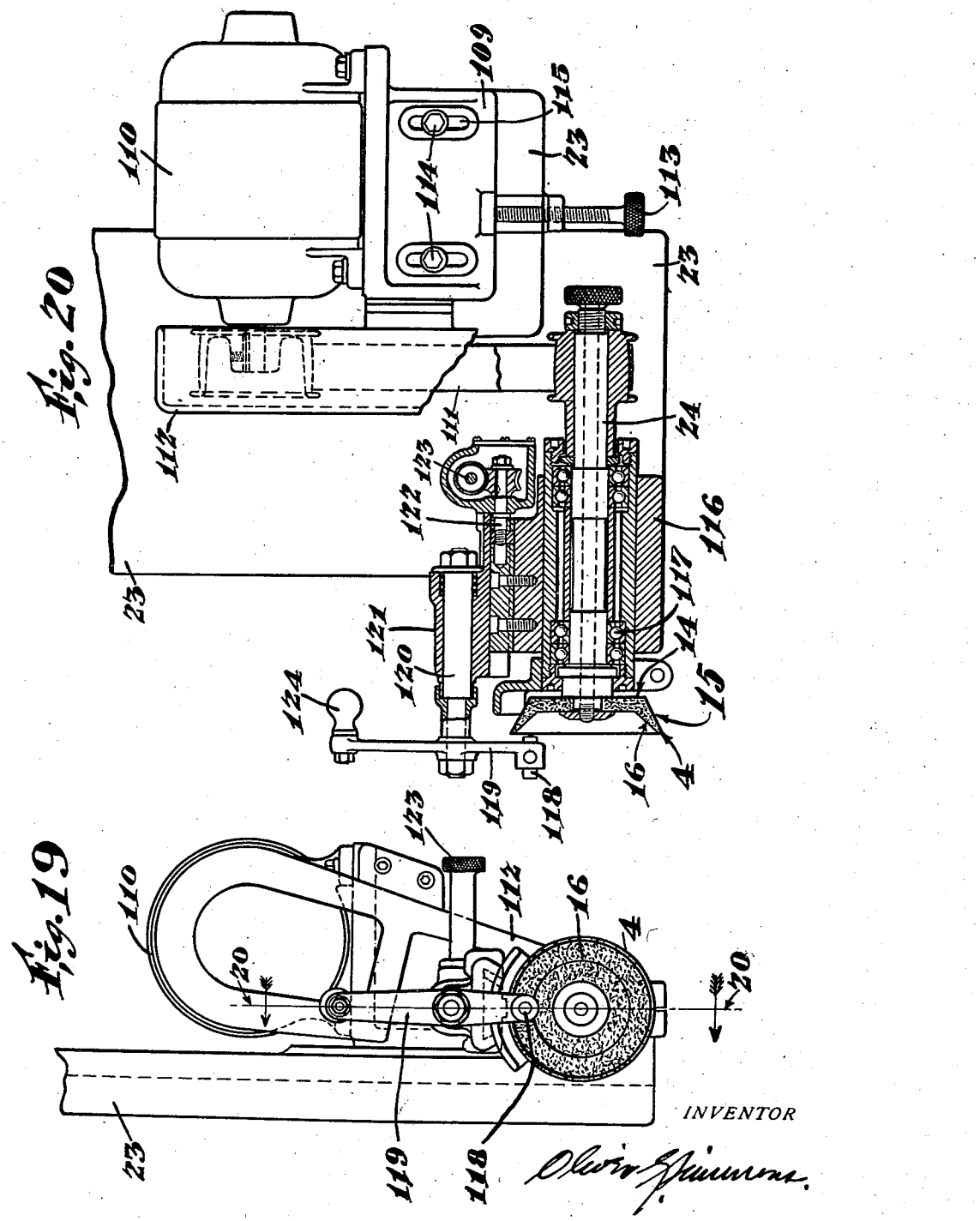

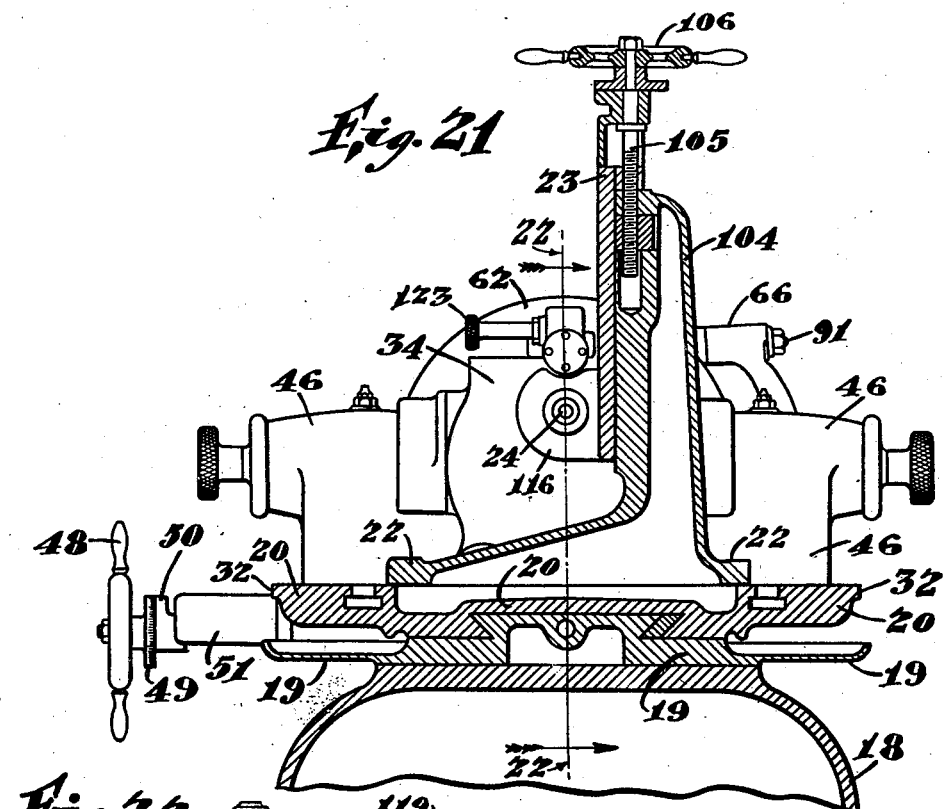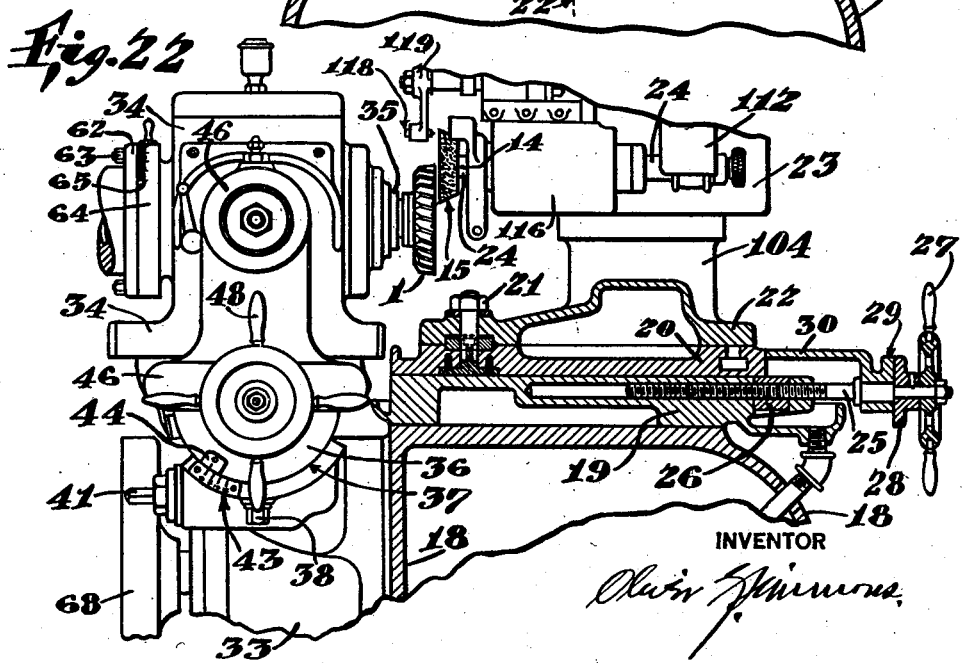

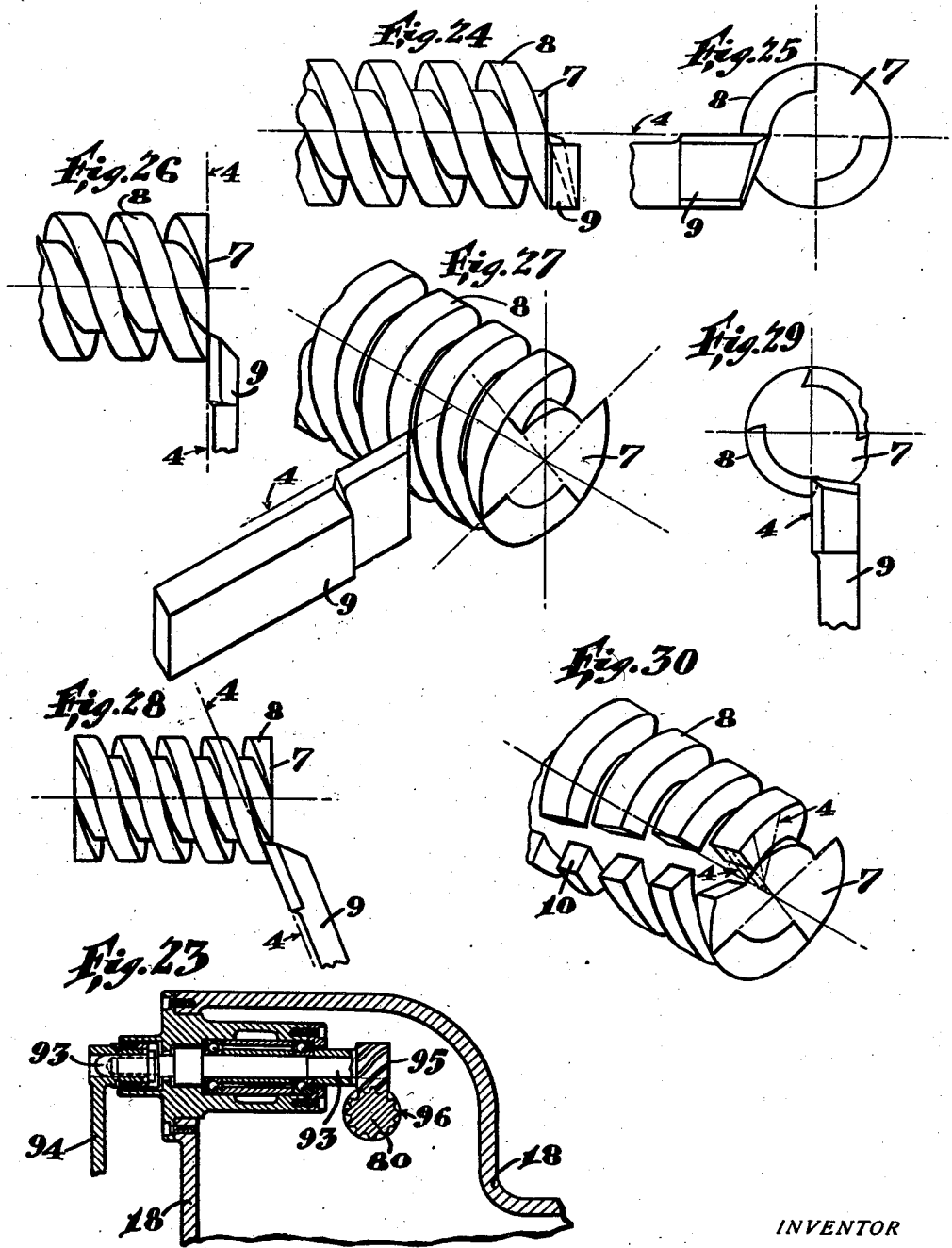

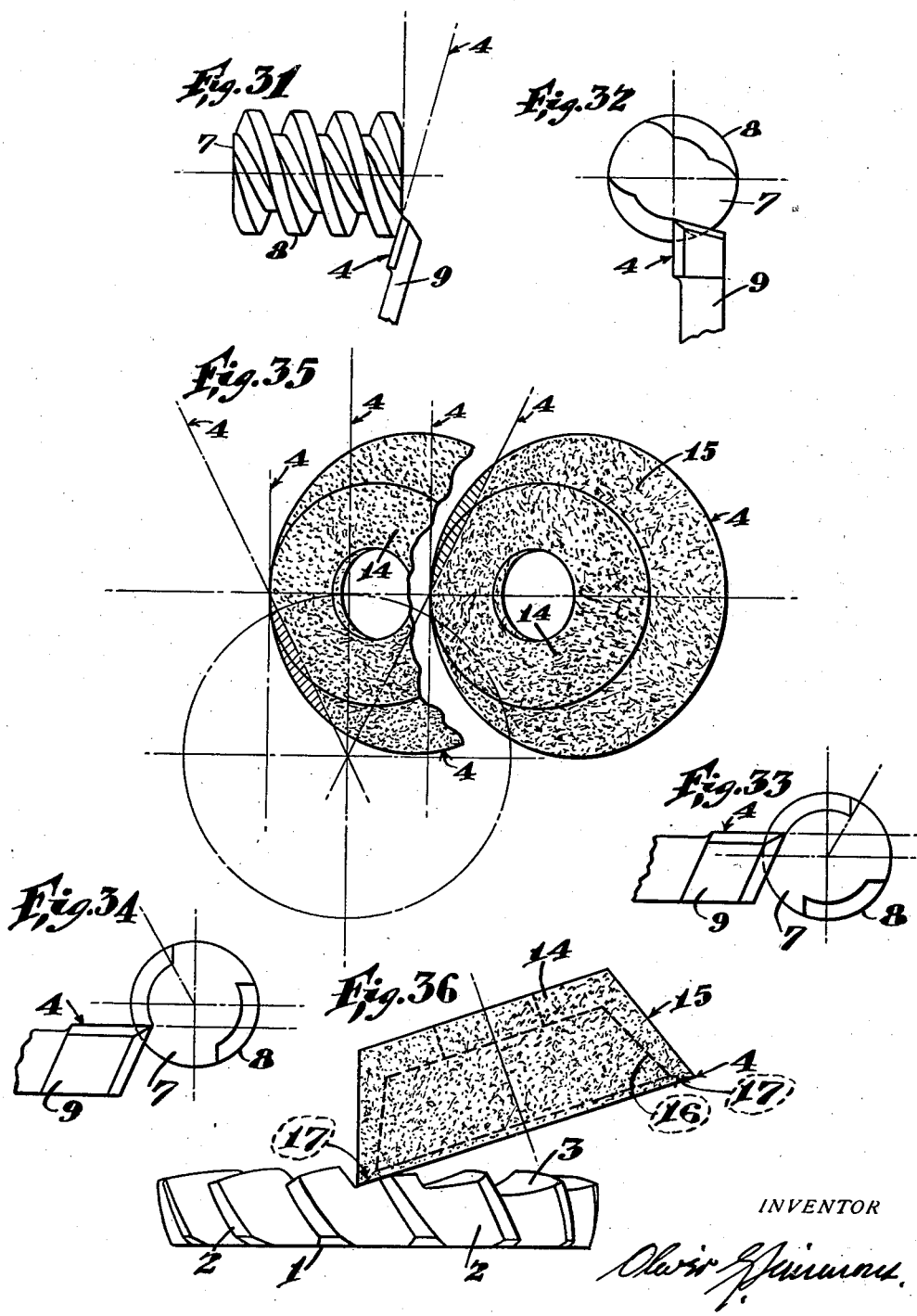

Dec. 29, 1936.  O. G. SIMMONS  2,065,950
METHOD OF AND APPARATUS FOR GENERATING CURVED
SURFACES ON GEAR SHAPED CUTTERS AND THE LIKE
Filed Oct. 22, 1932  18 Sheets-Sheet 16
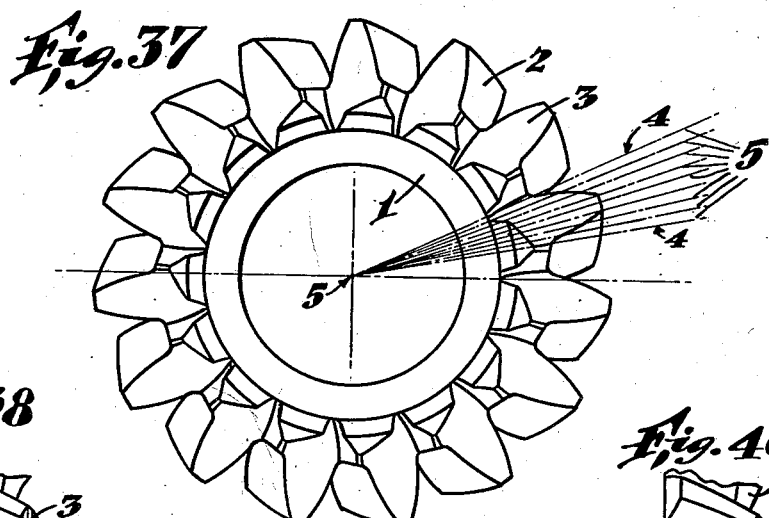
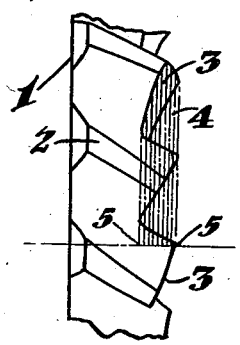
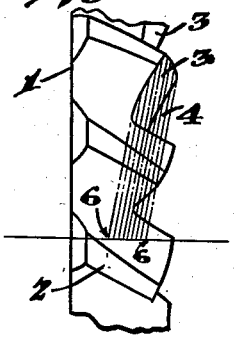
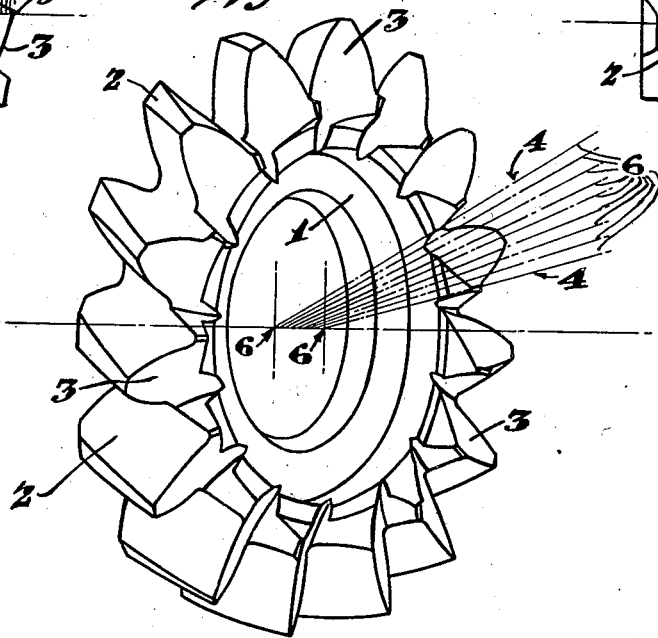
INVENTOR
Oliver G. Simmons INVENTOR
Olain Simmons Dec. 29, 1936.  O. G. SIMMONS  2,065,950
METHOD OF AND APPARATUS FOR GENERATING CURVED
SURFACES ON GEAR SHAPED CUTTERS AND THE LIKE
Filed Oct. 22, 1932   18 Sheets-Sheet 18

INVENTOR
Oliver Simmons.

Patented Dec. 29, 1936

2,065,950

UNITED STATES PATENT OFFICE 2,065,950

METHOD OF AND APPARATUS FOR GENERATING CURVED SURFACES ON GEAR SHAPED CUTTERS AND THE LIKE

Oliver G. Simmons, Lakewood, Ohio, assignor, by mesne assignments, to Dual L. Simmons Application October 22, 1932, Serial No. 639,028

11 Claims. (Cl. 51—225)

This invention relates to a method of and apparatus for generating curved surfaces and more particularly to a method of and apparatus for generating concave or convex surfaces of revolution or helicoid surfaces which have a straight line generatrix occupying a definite position relative to the axis of revolution.

Examples of surfaces of revolution of the straight line generatrix type are cones, in which the generatrix intersects the axis at an acute angle, and hyperboloids, in which the straight line generatrix is disposed at a fixed inclination to the axis but is spaced laterally thereof.

Examples of helicoids of the straight line generatrix type are the radial helicoid in which the generatrix intersects the axis either at right angles or at an inclination and moves uniformly along the axis and angularly about the axis in generating the helicoid surface, and the helicoids in which the straight line generatrix is spaced a given distance from the axis and is disposed at a fixed angle to the axis, the generatrix moving angularly about the axis and having a proportional movement longitudinally of the axis in generating the helicoid surface.

The radial helicoids in which the generatrix is perpendicular to the axis intersect planes perpendicular to the axis along straight radial lines.

The line of intersection between a radial helicoid whose generatrix is inclined to the axis and a plane perpendicular to the axis is an Archimedian spiral.

The line of intersection between a helicoid having a straight line generatrix spaced from the axis and a plane perpendicular to the axis is the involute of a circle whose radius is equal to the length of the common normal of the generatrix and axis, provided the axial travel of the generatrix during one revolution about the axis is equal to the circumference of a circle having a radius equal to the length of the common normal times the tangent of the angle at which the generatrix is disposed with respect to the axis, the generatrix in this case being a straight line rolling on a helix of the evolute cylinder. If the axial travel of the generatrix is greater or less than that required to generate the involute helicoid, the curve will intersect a plane perpendicular to the axis along spiral curves, which are closely related to the involute.

The involute of a circle is the limiting form of the epicycloid, being generated by a point on a circle of infinite diameter rolling on a circle of finite diameter and the spiral curves of straight line generatrix helicoids lying in planes perpendicular to the axis, including the Archimedian spiral, are epitrochoids generated by a point outside the rolling line which is maintained in a fixed position with respect thereto.

The straight line generatrix helicoids, other than involute helicoids, are generated by a line maintained in a fixed position relative to a generatrix of an involute helicoid and may, therefore, be properly referred to as epitrochoidal helicoids.

The straight line generatrix surfaces above referred to are important in connection with the generation of gearing of various forms, particularly helical gearing by reason of their close relationship to involute contours, particularly the involute helicoids of helical gears.

In the manufacture of cutters of the intermeshing type for the generation of gears on the molding generating principle of operation, it is often an exceedingly difficult problem to provide cutting edges which will correctly generate and correctly space the involute gear tooth faces. Avoidance of errors due to the incorrect form of cutting edges is extremely difficult in the case of helical gear shaped cutters in which the teeth of the cutter are disposed at an angle to the front face thereof, such that, in order to obtain efficient cutting action, in one conventional practice, the front faces of the teeth must be cut back along one side edge at least, in order to provide an angle of intersection between the end faces and side faces of the teeth, such that the edges of the teeth will effectively cut the metal of the blank.

If the side faces of the cutter teeth are involute helicoids, the only planes which will intersect the side faces on involute curves are planes perpendicular to the axis of the cutter, as referred to in my patent granted June 16, 1931, No. 1,809,869.

When helical gear shaped cutter teeth are cut back to provide a cutting face lying in a plane normal to the pitch cylinder helix, in order to provide end cutting faces substantially normal to the side faces thereof, the effective width of the teeth is changed and the contours of the cutting edges are changed. The errors due to this conventional practice of grinding the end cutting faces of the teeth may be partially compensated for by varying the width and pressure angles of the tooth of the cutter by substituting different pressure angles for each side of the tooth, but it is often a temporizing or compromising proposition to obtain the desired accuracy due to the fact that the cutting edges are not of true involute form and are not of a form such that they are capable of generating true involute surfaces with small limits of error as demanded in present day commercial practice.

One of the most important objects of the present invention is the production of helical gear shaped cutters provided with curved surfaces on the end faces of the cutter teeth which intersect the side faces of the teeth on lines forming cutting edges which are so positioned and are of a form such that they will correctly generate and correctly space involute tooth surfaces and which have teeth of the width and helicoid faces involute to base cylinders of diameters necessary to enable the involute helicoid side cutting faces of the cutter to accurately generate the involute teeth of a given helical gear.

A further object is to provide a method of generating curved surfaces of the character referred to on the end faces of teeth of gear shaped cutters.

It is a further important object of this invention to provide a radial helicoid gear shaped cutter and the like, including other analogous articles of manufacture, with teeth of predetermined form, adapting said gear shaped cutter to generate involute curves to a given evolute in a plane of revolution on each side of the teeth of gears, helical gears, worms, etc., which are to be provided with teeth having helicoidal involute side surfaces.

Within the scope of the term analogous articles of manufacture, it is understood that there is included such articles as have cutting teeth with cutting surfaces capable of being generated on curved lines of convolution.

A further object of the invention is to provide a machine capable of rapidly and accurately generating and accurately spacing curved surfaces of the character described on the end faces of cutter teeth.

A further object is to provide a machine which may be adjusted to accommodate cutters of any size, cutters of any helix angle and cutters having any number of teeth.

A further object of the invention is to provide an automatically indexing generating machine which operates automatically to successively generate the end faces of the teeth of a cutter.

The invention further consists in the means for accomplishing the foregoing objects and other objects of the invention which will later appear, not only in the particular form herein illustrated, but in all equivalent constructions and arrangements.

With the above and other objects in view, the invention may be said to comprise the method and one form of device as illustrated in the accompanying drawings hereinafter described and particularly set forth in the appended claims, together with such variation and modification thereof as will be apparent to one skilled in the art to which the invention appertains. Reference should be had to the accompanying drawings forming a part of this specification in which:

Fig. 8 is a section taken on the line indicated at 8—8 in Fig. 3;

Fig. 9 is a section taken on the line indicated at 9—9 in Fig. 3;

Fig. 10 is a section taken on the line indicated at 10—10 in Fig. 2;

Fig. 11 is a section taken on the line indicated at 11—11 in Fig. 10;

Fig. 12 is a section taken on the line indicated at 12—12 in Fig. 10;

Fig. 13 is a fragmentary elevation looking toward the end of the work spindle and showing the spindle indexing head and the spindle oscillating means;

Fig. 14 is a section taken on the line indicated at 14—14 in Fig. 13;

Fig. 15 is a section taken on the line indicated at 15—15 in Fig. 13;

Fig. 16 is a section taken on the line indicated at 16—16 in Fig. 13;

Fig. 17 is a fragmentary rear elevation of the upper portion of the grinder turret and the vertically adjustable grinding wheel spindle support;

Fig. 18 is a fragmentary front elevation of the vertically adjustable motor and spindle support shown in Fig. 17;

Fig. 19 is an elevation of the grinding wheel and its vertically adjustable support looking toward the face of the grinding wheel;

Fig. 20 is a section taken on the line indicated at 20—20 in Fig. 19;

Fig. 21 is a fragmentary section taken on the line indicated at 21—21 in Fig. 2;

Fig. 22 is a fragmentary section taken on the line indicated at 22—22 in Fig. 21;

Fig. 23 is a section taken on the line indicated at 23—23 in Fig. 9;

Figs. 24 to 34 are diagrammatic views showing various straight line generatrix helicoids on the faces of screw threads which may be cut on a lathe by means of a straight edge cutter which travels axially as the blank is rotated;

Fig. 35 is a diagrammatic view showing the conical grinding wheel cutting element in various positions with respect to the axis of the work and indicating the edge portion of the grinding wheel which provides a substantially straight generating line;

Fig. 36 is a diagrammatic view showing a gear shaped cutter and the conical grinding wheel cutting element in position for generating the end cutting face of a tooth;

Fig. 37 is a front elevation of a gear shaped cutter made in accordance with the method of the present invention; and having end faces which are radial helicoids in which generating radii are disposed perpendicular to the axis;

Fig. 38 is a fragmentary side elevation of the cutter shown in Fig. 37;

Fig. 39 is a perspective view of a helical gear shaped cutter having generated end faces disposed substantially perpendicular to the side faces, each end face being a radial helicoid in which the generatrix is disposed with a small angle to the axis;

Fig. 40 is a fragmentary side elevation of the cutter shown in Fig. 39;

In order to provide clearance for the side tooth faces thereof, gear shaped cutters are formed with the pitch cylinder helices thereof converging at an angle of substantially four degrees toward the rear face of the cutter, the cutter having the form of a tapered gear which will mesh with a rack having straight flat face teeth but which is inclined at a small angle to the axis of the cutter. If the cutting edges lie in a plane perpendicular to the axis of the cutter, the cutter will generate a straight flank rack or gear teeth of involute form. However, if the cutting edges are disposed in planes at an inclination to planes perpendicular to the axis of the cutter, they will not generate a straight flank rack tooth or correct involute tooth faces, unless the cutting edges are of a form such that they will roll along a straight line on a face of a tooth of the rack conjugate to the cutter, since the line on the cutter rack tooth, upon which a cutting edge rolls, forms the line of intersection between the tooth face of the cutter rack and the tooth face of a rack generated by the cutting edge which would be disposed parallel with the cutter axis and at a small angle to the cutter rack.

Obviously, if the line upon which the cutting edge rolls is a curved line, the rack which the cutter will generate will have tooth faces which are curved instead of flat.

The angle of the cutter rack to the rack of the gear being generated by the cutter is a small angle, four or five degrees, and a slight deviation from the theoretically correct cutting edge curve will not cause an appreciable error, but it is highly desirable to provide a cutting edge which rolls exactly or very nearly along a straight line on a tooth face of the cutter rack.

Figure 41:
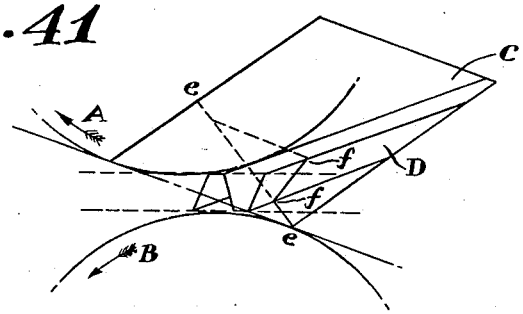
Fig. 41 is a diagrammatic view illustrating a method of ascertaining the theoretically correct form for the cutting edges of gear shaped cutter teeth when the cutting edges are disposed at an inclination to a plane perpendicular to the axis of the cutter.

In Fig. 41 of the drawings there is shown diagrammatically base cylinders A and B of two intermeshing gears together with a common tangent plane C and the conjugate rack D.

A line e—e is shown in plane C disposed at an angle to the perpendicular plane.

Assuming that the gears are rotating while the plane of action C remains fixed, the rack D will move through the plane C toward the left if the gears are rotating in the direction indicated by the arrows.

During the travel of the rack the line e—e will generate a straight line f—f on each rack tooth face disposed perpendicular to the plane of action C, and the line e—e will cut through the teeth of the gears along a line on each tooth face which engages with a tooth face of the rack perpendicular to the plane C, which will roll along the line f—f of the rack tooth face.

If the line e—e be a cutting edge held in fixed position while one of the gears is rotated, it will generate a hyperboloid surface at the ends of the gear teeth. The line e—e is the straight line generatrix of a hyperboloid whose gorge circle coincides with the base circle of the gear.

A gear shaped cutter provided with a hyperboloid end face will correctly generate involute tooth faces regardless of the amount of undercut provided in the cutter teeth.

The pressure angle of the teeth generated by such a cutter will not be the same as the pressure angle of the cutter teeth, but since it is known that the line of action of the cutting edge on the teeth of the cutter rack is the line of intersection between the rack tooth faces of the cutter rack and gear rack, and since the angle at which the cutter rack is disposed to the gear rack is known, it is an easy matter to determine the diameter which the base circle of the cutter teeth should have in order to generate teeth of the desired pressure angle in the gear.

The hyperboloid face may be employed on helical gear shaped cutters of a small helix angle, but where the helix angle is high, one of the tooth faces intersects a plane perpendicular to the axis at a very blunt obtuse angle while the other tooth face intersects a plane perpendicular to the axis at an angle which is too sharp. Merely providing such teeth with an undercut is not sufficient to provide an effective and equal cutting action.

It is, therefore, desirable in this type of helical cutter to provide the cutter teeth with end cutting faces in which the helices are disposed substantially at right angles to the helices of the teeth, so that the cutting edges at opposite sides of each tooth have substantially the same cutting action.

It may be readily demonstrated that helicoids of opposite inclination which have straight line generatrices tangent to the same base cylinder will intersect along lines which will continuously intersect a straight line in a fixed tangent plane as the helicoids are simultaneously rotated about their axes.

Figure 42:
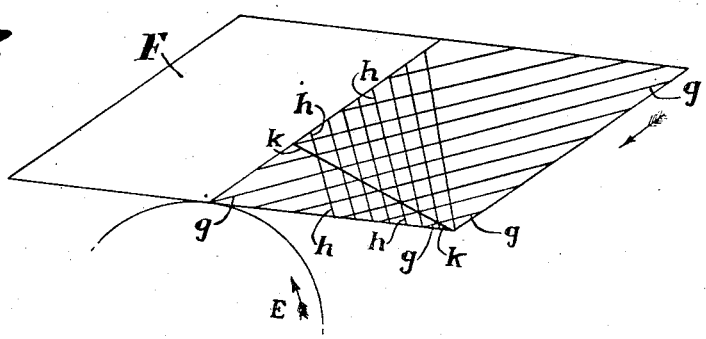
Fig. 42 is a diagrammatic view showing how a geometrically correct cutting edge inclined with respect to planes perpendicular to the cutter axis may be formed by the intersection of an involute tooth face with an oppositely inclined epitrochoidal helicoid.

In Fig. 42, E is the base cylinder of the helicoids and lines g—g are successive positions of straight line generatrices of a helicoid involute to the base cylinder such as the side face of the cutter tooth in a fixed plane F during rotation of the helicoid. The lines h—h are corresponding successive positions of straight line generatrices of an epitrochoidal helicoid of opposite inclination which may form the front face of a cutter tooth. The movement of the generatrices of both helicoids is proportional to the angular movement and the successive intersections of the generatrices g—g and h—h are along a straight line k—k which is the line of action of said cutting edge in the plane F.

If the epitrochoidal helicoids are disposed at substantially right angles to the side face involute helicoids of the teeth, the helicoid intersecting the side face of the tooth at the obtuse edge is concave while the helicoid intersecting the opposite face is convex. Therefore, to provide the theoretically correct form of cutting edge would require the generation of two helicoid surfaces on the end of each cutter tooth.

The faces of the cutter teeth must not only be originally cut to the correct form, but it is desirable that each end face be ground from time to time to resharpen the cutting teeth. The teeth are closely spaced and it is difficult to so dispose a generating grinding wheel in engagement with the end face of a tooth in such a manner that it will not engage with an adjacent tooth or simultaneously grind entirely across the face of the tooth.

I have found that a single continuous generated surface on the end face of a cutter tooth in the form of a radial helicoid, having its generatrix perpendicular to the axis, will provide cutting edges at opposite sides of the teeth which are very nearly of the correct form, and which have very accurate generating action, the deviation from the theoretically correct form not being sufficient to materially affect the generating action.

Figure 43:
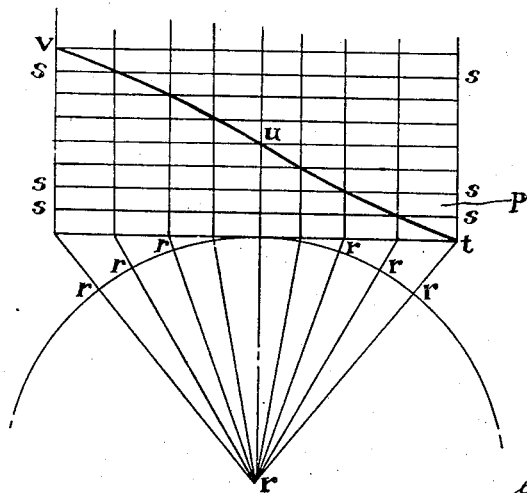
Fig. 43 is a diagrammatic view showing the line of intersection of a radial helicoid whose generatrix is perpendicular to the axis with a tangent plane.

In Fig. 43 of the drawings the lines $r—r$ indicate successive angular positions of the radial generatrix. P indicates a plane parallel to and spaced from the axis. Lines $s—s$ in plane P indicate the longitudinal travel of the generatrix $r—r$ for successive angular positions of the generatrix.

Curve $t, u, v$ is the line of intersection of the radial helicoid with the tangent plane P, the point $u$ being the point of tangency with the cylinder to which the plane P is tangent.

The curved line $t, u$ or the curved line $u, v$ is the generatrix of the radial helicoid in the plane P, and it will be noted that both $tu$ and $uv$, for the relatively short distance out from the point $u$ necessary to provide a generating line which will sweep across a cutter tooth face, are very nearly straight lines. It will also be noted that the line $t, u, v$ is nearly straight and disposed at the same inclination to the tangent line on opposite sides of the tangent line.

The line of intersection of an epitrochoidal helicoid with a plane tangent to the base cylinder is a straight line on one side only of the tangent line. On the opposite side of the point of tangency the line of intersection has considerable curvature.

By reason of the fact that both $tu$ and $uv$ deviate but slightly from a straight line, the cutting edges provided by the radial helicoid which may be generated by rotation and axial travel of line $tu$ or $uv$ at its intersection with side faces of the cutter teeth will be almost identical with the theoretically correct cutting edges provided by concave and convex epitrochoidal helicoids on the front face of a tooth which intersect opposite side faces thereof. It is thus possible to provide a single generated surface on the end face of a cutter tooth which is normal to the side faces of the tooth and which provides cutting edges which will accurately generate the desired involute contours of gear teeth.

In Figs. 37 and 38 there is shown a gear shaped cutter I having helicoid teeth 2 which are provided with end faces 3, each of which is a radial helicoid extending substantially at right angles to the teeth and having its generatrix 4 at right angles to the axis, successive positions of the generatrix along the face of a tooth being shown at 5—5.

Figs. 39 and 40 show a similar cutter I in which the helicoid end faces 3 have a radial generatrix 4 which is inclined inwardly at a slight angle to planes perpendicular to the axis, successive positions of the generatrix across the face of a tooth being shown at 6—6.

The cutting edges provided by a radial helicoid having its generatrix perpendicular to the axis, as shown in Figs. 37 and 38, are more nearly correct than where the generatrix is inclined to the axis to provide the teeth with an undercut or hook as shown in Figs. 39 and 40.

The undercut is desirable for roughing cutters since it enables the cutter to take deeper cuts, but the more accurate form, shown in Figs. 37 and 38, should be employed for finishing cutters.

Figs. 24 to 34 inclusive show diagrammatically helicoid surfaces which may be generated on screw threads and which are similar to the helicoid surfaces which are generated by the method of the present invention on the end faces of gear shaped cutter teeth.

In Figs. 24 to 32, a blank 7 is shown provided with helical threads 8, the side faces of which are helicoids which may be generated in a lathe by means of a straight edge cutter 9 which is disposed with its cutting edge extending radially, perpendicular to the axis as shown in Figs. 24 to 27, or at an inclination to the axis as shown in Figs. 28, 29, 31 and 32. In the case of the screw threads, the generatrix of the side face helicoids is the line of the cutting edge of the cutter which is advanced longitudinally of the blank as the blank is rotated.

As shown in Fig. 30, the teeth of threads may be gashed along helicoidal lines at right angles to the threads to provide end radial helicoid faces 10 which intersect the helicoidal side faces at approximately right angles. This is conventional practice with respect to hobbing cutters.

Figs. 33 and 34 illustrate methods of generating other epitrochoidal helicoid side faces on the threads of a blank 7 by means of a cutter 9 which has a straight cutting edge which lies in a line crossing the axis of the screw but spaced therefrom.

As will be seen by inspecting Figs. 37 to 40, the helicoid end faces of the teeth of a gear shaped cutter must be generated while the cutter is turning through a very small angle. It is, therefore, impractical to employ a cutter of the character used in generating corresponding helicoids on screw threads, since in order to remove the metal from the end faces of the cutter teeth it is necessary to provide a rapid relative movement between the work and the generating element. This is accomplished in the present invention by employing, for the generating element, a rotary cutting element which may be a milling cutter for originally cutting the end faces of the teeth or a grinding wheel for sharpening the end faces.

As shown in Figs. 35 and 36, this rotary cutting or generating element is in the form of a cup-shaped grinding wheel 14 having an outwardly flaring conical outer peripheral face surface 15, a conical inner face 16 and an outer edge formed by a conical surface 17 along the edge of the cup-shaped wheel which has a large angle of taper and which intersects the outer conical surface 15 of the wheel at a relatively sharp angle.

In generating the end faces of the teeth, the grinding wheel 14 is positioned with its outer face at an angle to the face of the cutter, such that a short arc of the sharp edge at the intersection of surfaces 15 and 17 results in a line generatrix which contacts with the end face of a tooth upon which the curved surface is to be generated. The grinding wheel of the cutting element thus has a line contact with the surface being generated which by proper adjustment of the work and cutter spindles may be positioned to correspond to the position of a straight line generatrix of the curve to be generated on the end faces of the teeth.

It will be apparent that if the generating line is properly positioned and there is a relative movement between the grinding wheel and gear shaped cutter in an axial direction which is proportional to the relative angular movement between the grinding wheel and cutter, the surface generated will be a helicoid surface having a straight line generatrix except for the very minute error due to the slight curvature of the generating line contacting with the end face of the tooth.

The machine of the present invention is designed to provide means for rapidly generating straight line generatrix curves on the end cutting faces of gear shaped cutter teeth and particularly for generating helicoid end cutting faces disposed at right angles to the involute helicoid side faces of the teeth.

The machine automatically imparts the relative angular and axial movements to the line generatrix cutting element and gear shaped cutter during the generation of each tooth face and automatically indexes the work spindle to generate the radial helicoid surfaces on the face cutting ends of successive teeth.

As shown in Figs. 1 to 4, 9, 21, 22 and other figures of the drawings, the bed housing 18 of the machine of the present invention has bolted and fixed thereto a suitable slide base 19 upon the top of which is mounted a horizontally adjustable turret slide 20 to which is bolted, by means of bolts 21, an angularly adjustable turret 22 which carries a vertically adjustable slide 23 upon which the grinding wheel spindle 24 and its driving mechanism is mounted.

The turret slide 20 is provided with a screw 25 having threaded engagement with a nut 26 secured to the slide base 19, the screw 25 being operated by a hand wheel 27 for linear adjustment of the cutting element 14 toward or away from the work 1.

A graduated dial 28 is provided to coact with a zero line 29 located on the raised portion of the turret slide bracket 30 which is securely bolted to the turret slide 20, to accurately indicate this measure of adjustment.

The angularly adjustable turret 22 is provided with vernier plates 31 adapted to coact with the degree graduation 32 of the turret slide 20 and to be clamped in adjusted position by means of the bolts 21.

Laterally of the turret 22 the bed housing 18 is provided with a bracket 33 which provides a support for a spindle carrying head 34 in which a horizontally disposed work spindle 35 is journaled. The head 34 is carried by an elongated base member 36 of semi-cylindrical form which is disposed at right angles to the work spindle 35 and which is mounted to rock laterally in a correspondingly curved seat 37 formed in the bracket 33 whereby the head 34 may be adjusted angularly about a horizontal axis transverse to the spindle 35 to dispose the spindle 35 at various inclinations to the horizontal.

By adjusting the slide 23 vertically and the turret slide 20 horizontally, the grinding wheel 14 may be raised or lowered with respect to the axis of the work spindle 35 and moved toward or away from the work piece 1.

To the inner end of the work spindle 35 a gear shaped cutter or other work piece 1 is secured.

By means of the angular adjustment of the turret 22, the face 15 of the grinding wheel 14 is positioned to coincide with the vertical plane of the axis of the gear shaped cutter or other work piece 1 on the work spindle 35. These adjustments enable the work and cutting element spindles to be so adjusted relatively that the straight line generatrix 4 provided by the edge line of intersection of surfaces 15 and 17, of the cutting element 14, can be positioned at the desired distance from and at the desired angle to the axis of the work spindle and, in addition, the cutting element 14 can be moved to take successive cuts. This movement is in the direction of the axis of the work piece, the vertical plane of which is tangent to the peripheral surface 15 of the cutting element 14.

Any reduction in diameter of the cutting element, due to wear, will have no influence, therefore, on the adjustment positions of the elements above referred to.

As best shown in Figs. 10, 11 and 12, the elongated base member 36 is mounted for lateral turning movement in the semi-cylindrical seat 37 in the top of the bracket 33 and is rigidly held in adjusted angular positions by means of clamping bolts 38 which extend through the bracket into arcuate undercut grooves 39 in the round bottom of the base member 36 and which have nuts 40 within the grooves.

Angular adjustment of the spindle supporting head 34 is effected by means of a manually operable worm 41 which meshes with a worm wheel segment 42 formed in the bottom of the base member 36.

Figure 2:
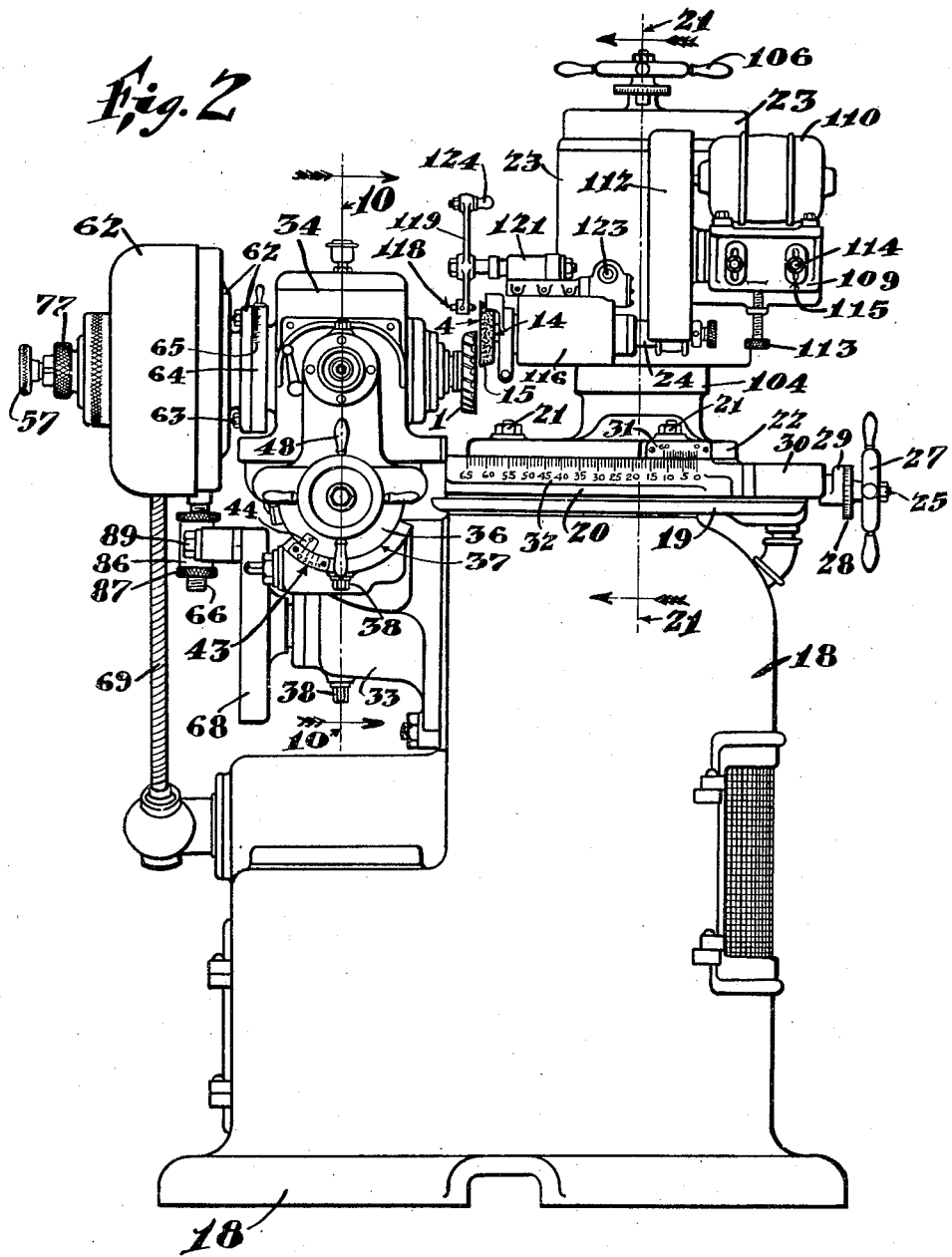
Fig. 2 is a front elevation of the machine.

As shown in Fig. 2, the forward edge of the supporting seat of the bracket 33 is provided with a degree graduated scale 43 with which a mark 44 on the forward end of the base supporting member 36 cooperates to indicate the angular adjustment of the support.

As shown in Fig. 8, the supporting member 36 is provided on the top thereof with a longitudinal guide way 45 upon which is mounted a slide 46 and which may be adjusted longitudinally of the base member 36 by means of a screw 47 which, as shown in Fig. 10, is provided with a hand wheel 48 and a graduated disc 49 cooperating with a zero line 50 located on an end position bracket 51, which is bolted to the slide 46, to indicate in thousandths of an inch the extent of linear movement imparted to the slide 46 by the hand wheel.

Figure 3:
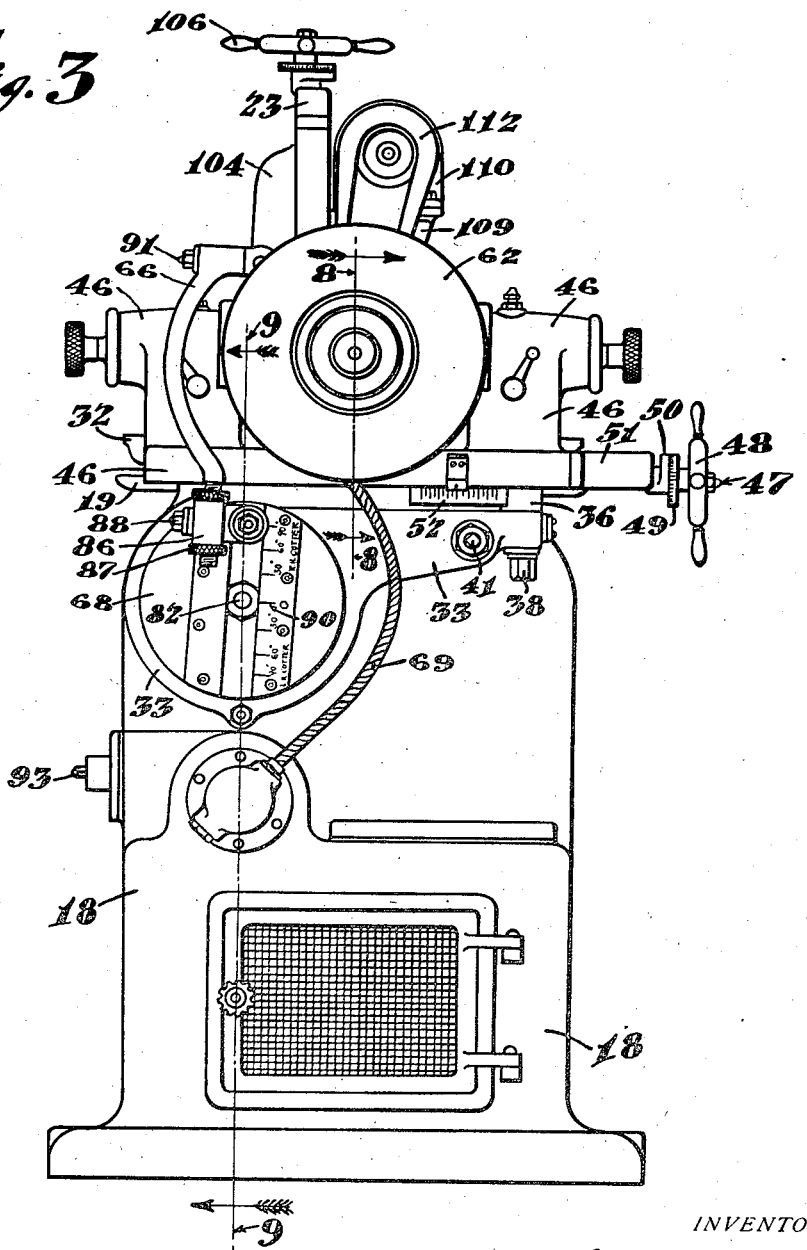
Fig. 3 is a side elevation of the machine.

The linear adjustment of the slide 46 is also accurately indicated and adjusted when setting up the machine by means of a scale 52, as shown in Fig. 3. The slide 46, as best shown in Figs. 8 and 10, is provided with transverse ways 53 upon which the work spindle head 34 is mounted for movement parallel with the axis of the work spindle 35.

As best shown in Fig. 8, the work index spindle 35 is a tubular spindle having a conical recess at its forward end to receive the conical work holding arbor 54 to which the gear shaped cutter or other work piece 1 is clamped by means of a flanged nut 55 and a tie bolt 56 extending from the nut 55 to the rear end of the index spindle 35, where it is provided with a small hand wheel 57 by means of which it may be turned to draw the nut 55 against the gear shaped cutter or other work piece on the outer end of the arbor 54.

The spindle 35 is rigidly held against endwise movement in the head 34 by means of initially loaded ball bearings 58 which are rigidly clamped in the forward end of the head.

Surrounding the spindle 35 within the head there is a helical cam sleeve 59 which is journaled in ball bearings 60 in the front and rear walls of the head 34 and which carries at its rear end a ball bearing 61 in which the spindle 35 is journaled.

Figure 7:
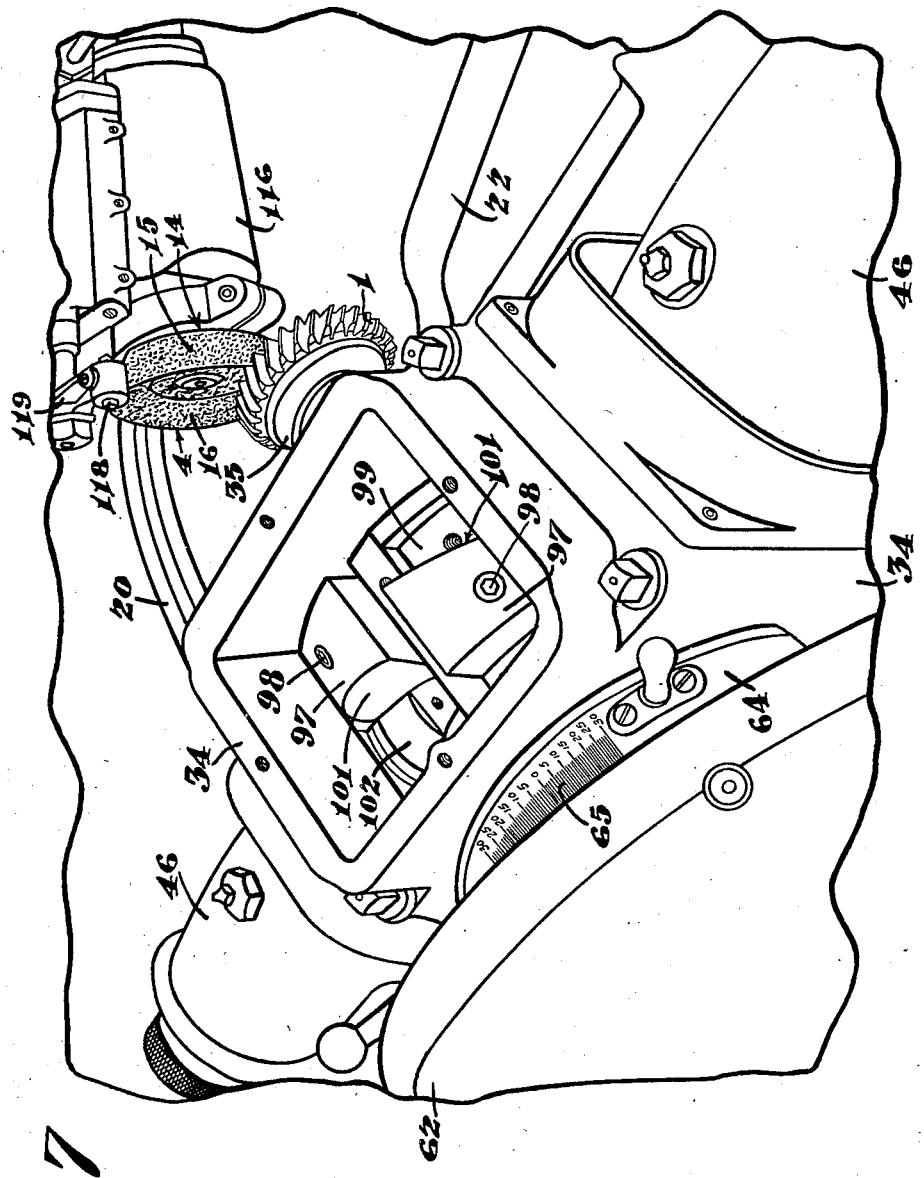
Fig. 7 is a perspective view showing the grinding wheel, a portion of the work spindle supporting head, a gear shaped cutter on the work spindle and the helical guides also on the work spindle.

Surrounding the spindle 35 to the outer side of the head 34 is an index housing 62 which is adjustably clamped by means of bolts 63 to a disc 64 fixed to the rear end of the helical cam sleeve 59 so that the sleeve 59 is constrained to turn with the index housing 62, the adjustment of the housing being indicated by the scale 65 as shown in Fig. 7. The indexing mechanism, comprising the escapement device, change gears, feeding mechanism to angularly move the work to position same to the cutting element, etc., within the housing 62 may be, and preferably is, the same as that shown in my Patent No. 1,752,033, granted March 25, 1930.

During the operation of the machine, the housing 62 and helical cam sleeve 59 are continuously oscillated. The work index spindle 35 normally turns with the housing but is advanced angularly one tooth space during a portion of each oscillating movement by means of intermittently actuated gearing within the housing.

Figure 1:
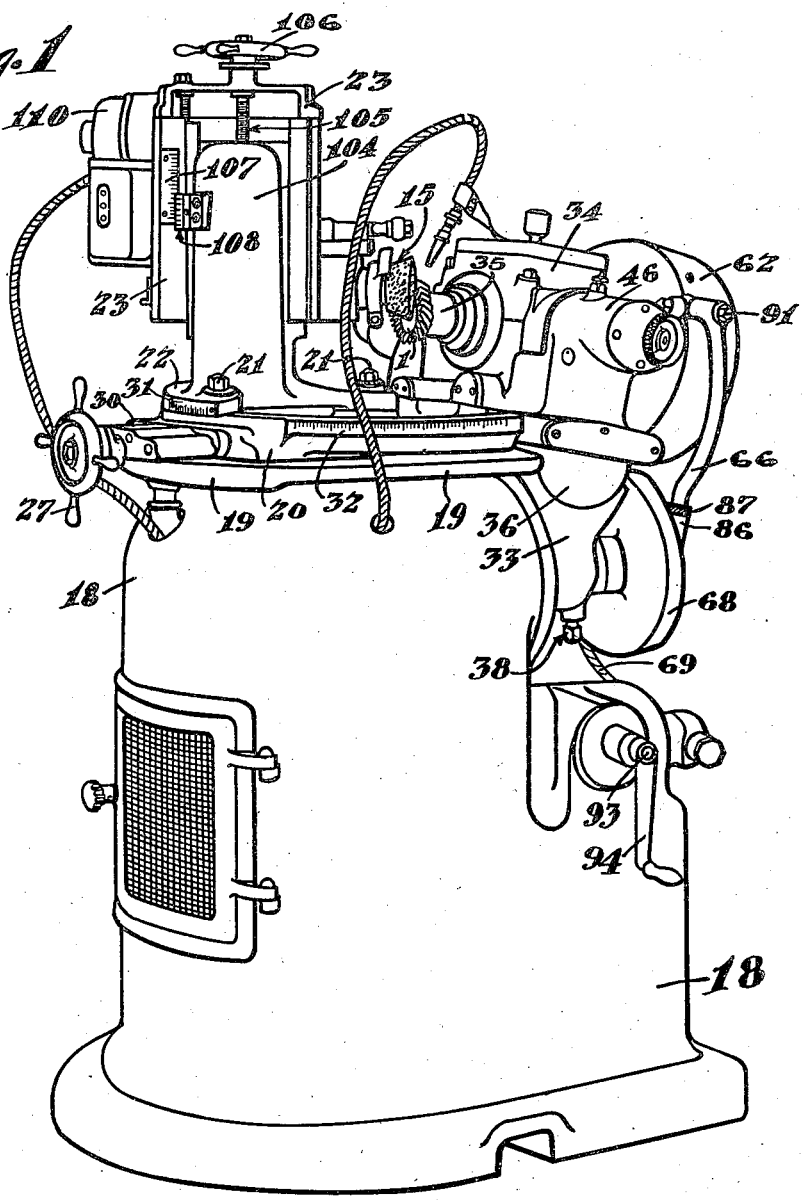
Figure 1 is a perspective view of a machine embodying the invention.

The oscillating movement is imparted to the index housing 62 and helical guide cam sleeve 59 by means of a connecting rod 66 connected to the periphery indicated at 67 remote from the axis of the housing 62 and to a continuously driven crank disc 68, as best shown in Fig. 13. The intermittent indexing gearing within the index housing 62 is driven by a flexible shaft 69 extending from the base housing 18 to the index housing 62, as shown in Figs. 1, 2 and 3, which continuously drives the intermittent gearing of the indexing mechanism.

As shown in Fig. 8, a gear hub sleeve 70 is mounted on ball bearings 71 on the spindle 35 and has integral therewith at one end a gear 72 and at the other end, and fixed thereto, an anchor index wheel 73. A worm 74 is journaled in a bracket 75 fixed to the hub of the index wheel 73 and meshes with a worm wheel 76 fixed to the spindle 35. The worm 74, integral with its shaft, normally constrains the spindle 35 to turn with the hub sleeve 70, but may be turned within the sleeve to adjust the work angularly toward or away from the line generatrix cutting element when setting up the machine, by means of a manually operable crown gear 77 rotatably mounted on a hub of the worm wheel 76 and meshing with a crown pinion gear fixed on one end of the integral worm shaft 74. The sleeve 70 is intermittently turned within the housing 62 to index the work by means of a pinion 78 on a shaft 79 journaled in the housing 62 and meshing with the gear 72. The shaft 79 is intermittently driven from the shaft 69 through Geneva stop gearing and change gears mounted on the housing 62, as shown and described in my Patent No. 1,752,033, above referred to.

The work index spindle oscillating and indexing mechanisms are driven from a suitable motor, not shown, within the base housing 18, which drives a horizontal shaft 80 journaled in the base, as shown in Fig. 9. The shaft 80 actuates the intermittent indexing gearing of the index head through the flexible shaft 69, which is driven through miter gears 81. The shaft 80 also actuates the spindle oscillating mechanism through a shaft 82 connected by suitable speed reducing gearing 83 to the shaft 80. This gearing 83 is partly journaled in the base 18 and partly in the supporting bracket 33. The crank disk 68 is attached to the outer end of the shaft 82 and the connecting rod 66 is adjustably connected at its lower end to the disk. The disk 68 has a diametrical slot 84 in its outer face which receives a slide 85 to which the lower end of the connecting rod 66 is pivoted. The rod 66 has a threaded lower end which is adjustable in a pivot block 86 and which is held in adjusted position by lock nuts 87. The block 86 is pivoted on a pivot pin 88 which in turn is pivoted on a pin 89 carried by the slide 85 to swing about an axis at right angles to the face of the disk 68.

The extent of the angular oscillation of the index head and index work spindle and the limits of oscillation may be regulated by adjusting the slide 85 in the slot 84 and by adjusting the rod 66 in the pivot block 86. A scale 90 is mounted along side the slot 84 to indicate the position of adjustment of the slide 85, so that the throw of the connecting rod 66 can be very accurately regulated to oscillate the head and spindle through a larger or smaller angle, as may be desired. The upper end of the connecting rod 66 is pivotally connected to a laterally extending pin 91, the projecting end of which is pivoted to a pin 92 secured to the housing 62 and disposed at right angles to the pin 91. The pivot 92 permits lateral swinging of the connecting rod 66 as is necessary due to the lateral movement of the portion of the housing 62 to which the rod is connected, and the pivot pin 91 prevents the transmission of torsional stresses to the pivot bearing on the pin 92. Universal movement is thus provided at both ends of the connecting rod 66 so that a smooth, uniform oscillating movement is obtained. As shown in Figs. 3, 9 and 23, the indexing mechanism may be actuated manually by means of the crank handle 94 when desired by means of a manually operable shaft 93 geared to the shaft 80, by means of the helical gears 95 and 96.

In order to generate helicoid surfaces, means is provided for imparting to the work spindle an axial movement proportional to its angular turning movement during the generating portion of the stroke, and as best shown in Figs. 7 and 10, this result is accomplished by means of a pair of helical cams 97 detachably secured, by means of bolts 98, to a collar 99, fixedly secured in turn to the sleeve 59 by means of the nut 100 having threaded engagement with the sleeve 59. These cams 97 are provided with helical cone surfaces 101 and engage conical rollers 102 carried by radially adjustable slides 103 mounted in side walls of the supporting slide 46 on opposite sides of the head 34. The helicoid faces 101 of cams 97 have an axial lead corresponding to that of the generatrix of the helicoid face being generated on the end of a cutter tooth and serve to give the cutter the axial movement relative to the generating element necessary to cause the generating element to travel in a helical path with respect to the work. The helical cams 97 can be readily replaced with other cams of greater or less axial lead and, if desired, by flat face guides which will cooperate with the rollers to positively hold the spindle against endwise movement as is necessary when generating a conical or hyperboloid surface on the ends of the cutter teeth.

The turret 22 has a vertical standard 104 which carries the vertically adjustable slide 23 which may be adjusted by means of a screw 105 and hand wheel 106. the slide being provided with a scale 107 which cooperates with a vernier scale 108 on the standard 104 to accurately indicate the position of vertical adjustment.

The slide 23 carries a vertically adjustable bracket 109 upon which is mounted an electric motor 110 which drives the grinding wheel spindle 24 through a belt 111 enclosed in a suitable housing 112. The bracket 109 is adjustable vertically to apply the proper tension to the belt 111 by means of a screw 113 and is clamped in adjusted position to the slide 23 by means of bolts 114 extending through vertical slots 115 in the bracket 109. The spindle 24 is journaled in a bearing arm 116 extending laterally from the lower portion of the slide 23 and is rigidly held against axial movement in the bearing arm by initially loaded ball bearings 117.

A dressing tool is mounted on the bearing arm 116 which consists of a diamond point 118 carried by an arm 119 pivoted on a horizontal shaft 120 carried by a slide 121 mounted above the grinding wheel spindle for adjustment axially of the spindle. The slide 121 may be adjusted by any conventional means, for example, by means of a screw 122 actuated through worm gearing from a manually actuated shaft 123. To dress the wheel the slide 121 is adjusted until the point 118 is brought into engagement with the rim 4 of the wheel 14, after which the point is swung back and forth across the rim of the wheel as in conventional practice by means of a handle 124 while the wheel is running.

When diamond dressing the wheel 14 to sharpen same, as above described, it is important to note that no additional adjustment to position the wheel angularly is necessary, since the grinding wheel, as previously described, is in the form of a cone. The angle of this cone surface with the axis is preferably made equal to the helix angle of the teeth of the gear shaped cutter to be sharpened. The peripheral surface 15 of the grinding wheel will, therefore, be tangent to the vertical plane of the axis of the gear shaped cutter, as previously described and shown in Fig. 36.

Hence, the grinding cutting element 14 may be reduced in diameter by dressing the surface 17 of the wheel, as previously described, but this dressing will in no way affect the adjustment of the axis of the grinding wheel with respect to the axis of the work. This insures very long life to the grinding wheel and it is only necessary for the operator to advance the grinding wheel into cutting contact with the work by causing the hand wheel 27 to be moved, and, as previously described, the amount of this movement is determined by means of the dial 28 and the zero line 29 on the slide 30. By moving this slide, the cutting element 14 is caused to move toward or away from the work, depending upon the direction of rotary movement given to the hand wheel 27 by the operator.

In the operation of the machine the work index spindle and the grinding wheel spindle are adjusted to bring the grinding wheel into engagement with an end of the tooth face of the gear shaped cutter or other work piece and to dispose the line of contact between the grinding wheel and cutter in proper relation with respect to the axis of the work spindle.

Assuming that the indexing mechanism has been properly adjusted to index the cutter from tooth to tooth, on each oscillation thereof, and that helical cams 97 have been provided, which will give the work spindle the proper axial travel during the movement of the generating edge of the grinding wheel across the face of the tooth, and the connecting rod 66 has been adjusted to provide an angle of oscillation such that the grinding wheel will sweep and thereby passes across the face of the tooth, the machine is started into operation, whereupon the work spindle will be slowly oscillated and will recede from the grinding wheel as the grinding wheel passes across the face of the tooth with which it engages. During the final portion of the angular stroke, the work is moved out of contact with the grinding wheel, whereupon the indexing mechanism operates to advance the work index spindle, bringing the next engaging tooth into generating position.

When the machine is adjusted for the particular cutter being formed or generated, it will operate continuously and automatically until the helicoid faces have been generated on all of the teeth of the cutter. The adjustment of the grinding wheel, with respect to the work, is the same for all of the teeth and the generated end faces will be identically positioned with respect to the axis of the work. All teeth of a gear shaped cutter will be ground back exactly the same so that the uniform spacing of teeth generated by the cutter will be insured.

Figure 4:
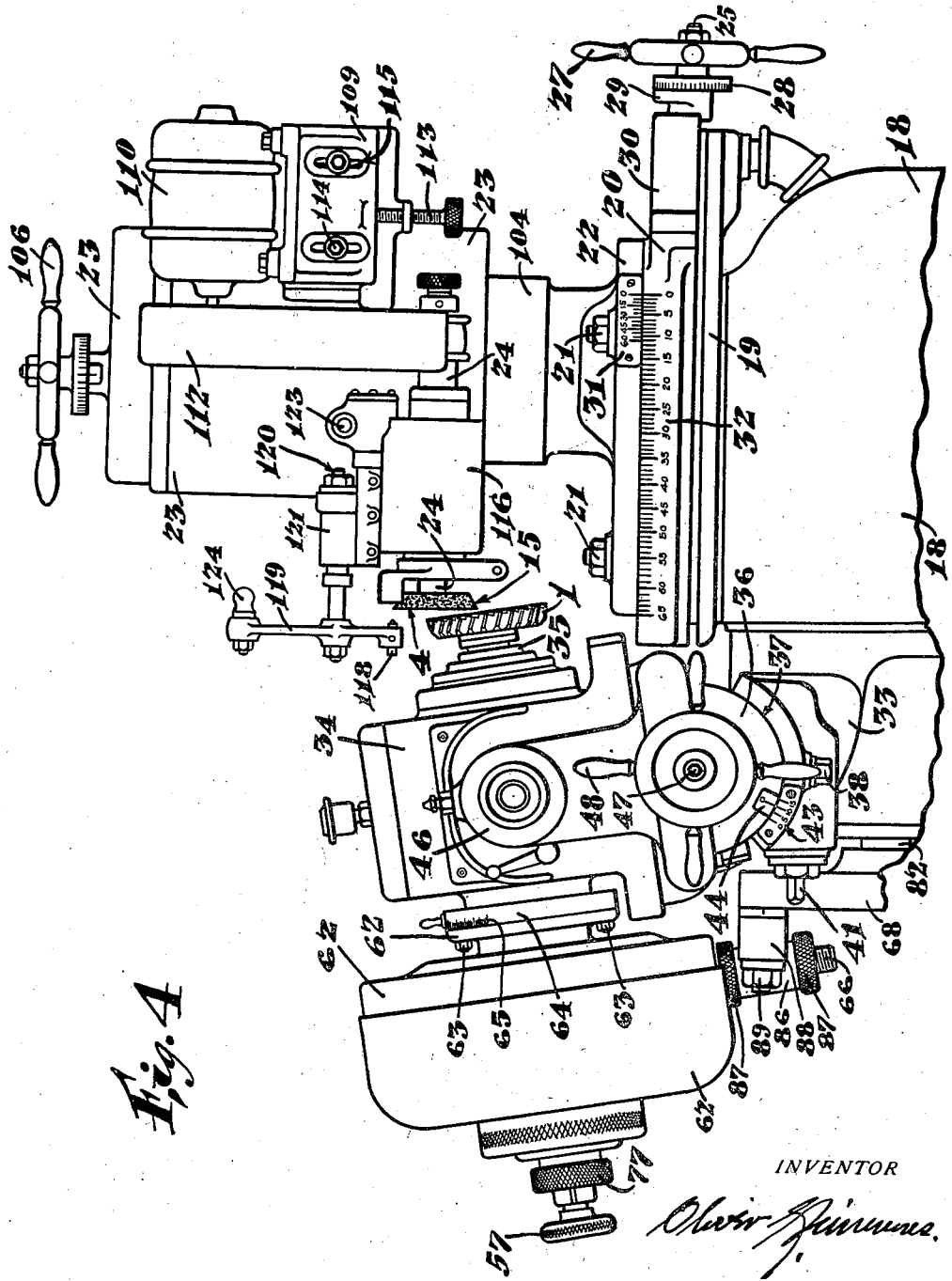
Fig. 4 is a front elevation of a portion of the machine, showing the work spindle supporting head adjusted to generate grind the end cutting faces of the teeth of a gear shaped cutter on an undercut hook angle of 10°, the work being carried by the work spindle.
Figure 5:
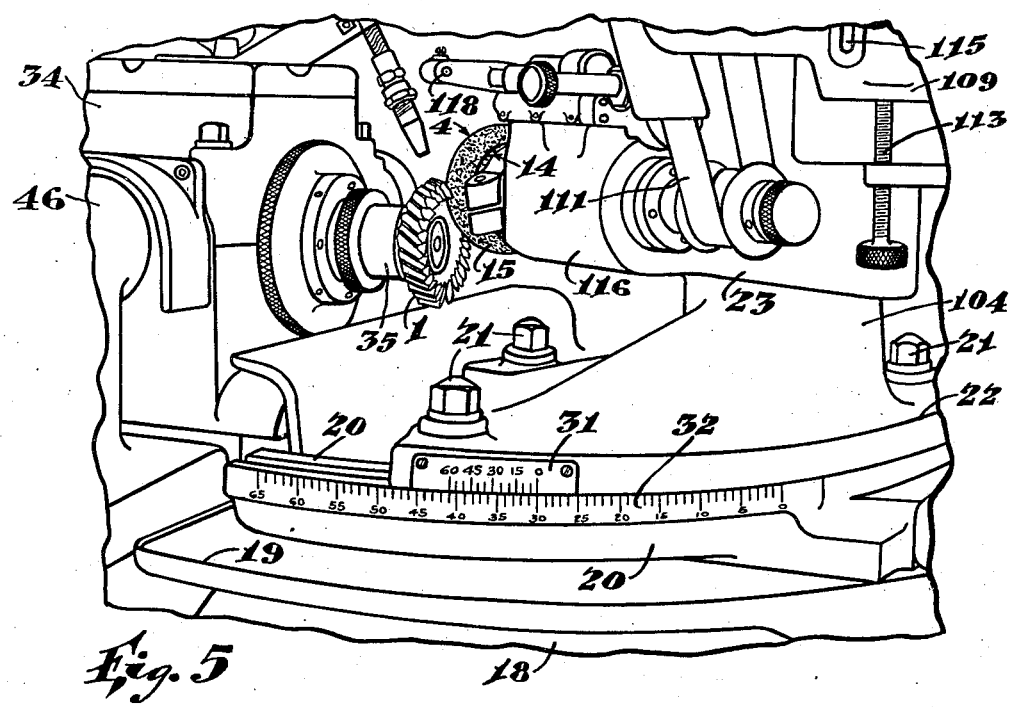
Fig. 5 is a perspective view showing the gear shaped cutter and grinding wheel in engagement.
Figure 6:
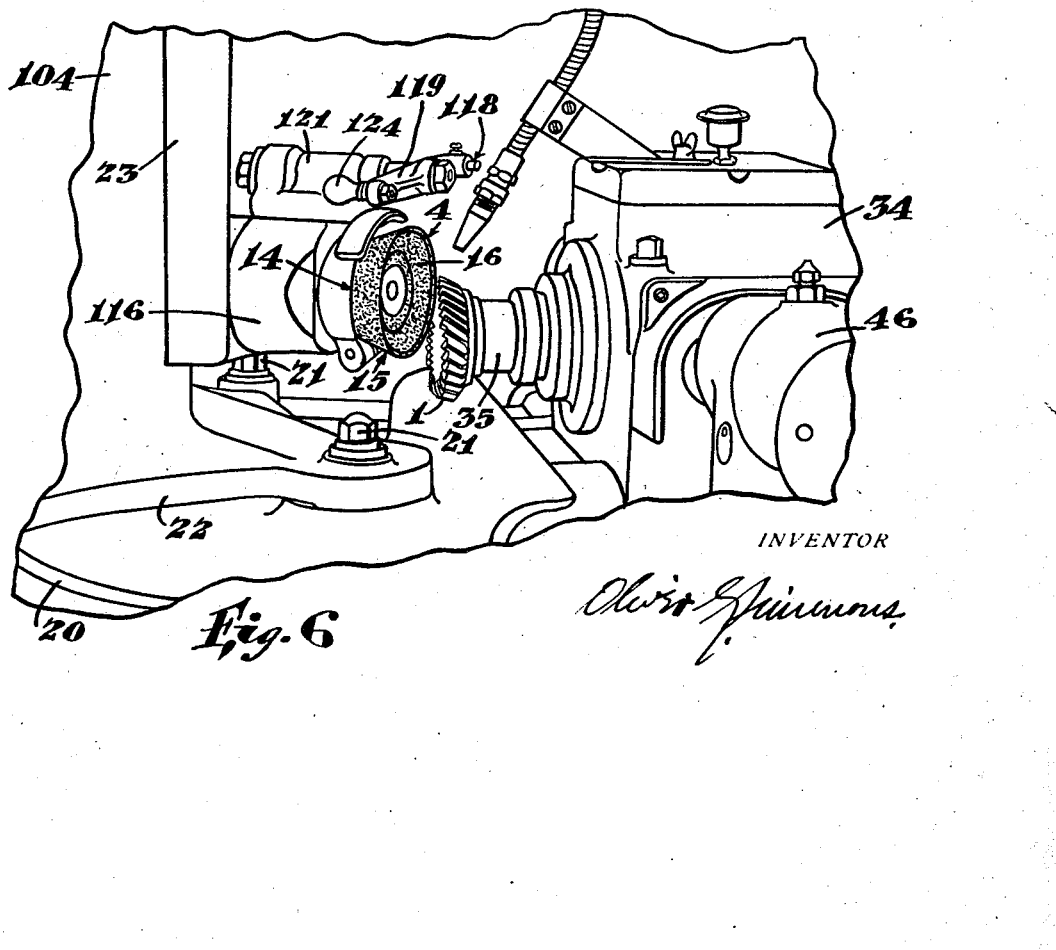
Fig. 6 is a perspective view of the gear shaped cutter and grinding wheel as viewed from a side of the machine opposite that shown in Fig. 5.

When the supporting member 36, shown in Fig. 22, is set at zero 44, with reference to the degree graduated scale 43, the axis of the work index spindle 35 and the axis of the cutting element spindle 24 will lie in parallel planes and a radial helicoid without undercut or hook will be generated, as shown in Fig. 38. If, however, it is desired to generate involute helicoids having a hook or undercut on the cutting face of the work, as shown in Fig. 40, the supporting member 36 may be adjusted to the desired angle of undercut or hook, as shown in Fig. 4. This is accomplished by rotating the worm 41, after loosening bolts 30, to move the member 36 to the desired angle of undercut, after which the bolts 30 may be tightened and the operation proceed as described, the operator making the necessary vertical adjustments of the vertical slide 23 to bring the axis of the cutting element 14 an amount above the axis of the work corresponding to the pitch radius of the work.

Figure 44:
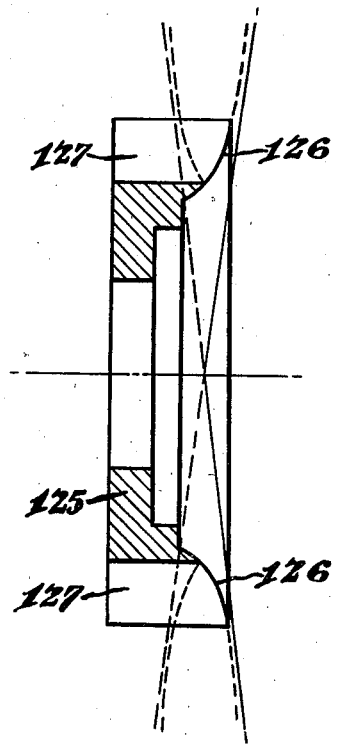
Fig. 44 is a sectional view showing a straight tooth gear shaped cutter having the end faces of its teeth lying in a generated hyperboloid surface.

Fig. 44 of the drawings shows a gear shaped cutter 125 provided with a reentrant hyperboloid face 126, the cutter being a gear shaped cutter having straight involute face tapered teeth 127. As above explained, the hyperboloid face can be generated with the machine of the present invention by holding the work spindle against axial movement, and disposing the grinding wheel 14 with its generating cutting element line 4 tangential to the base circle of the cutter and disposed at a reentrant angle with respect to the cutter face. The intersection of the involute side faces of the cutter teeth with the hyperboloid end face provides the undercut teeth with geometrically correct cutting edges.

Heretofore it has been common practice to provide straight tooth gear shaped cutters with reentrant conical faces, which faces, however, must have a very small reentrant angle, otherwise serious errors will result due to the incorrect form of the cutting edges. By providing a reentrant end face of hyperboloid form, the angle of undercut may be greatly increased.

Figure 45:
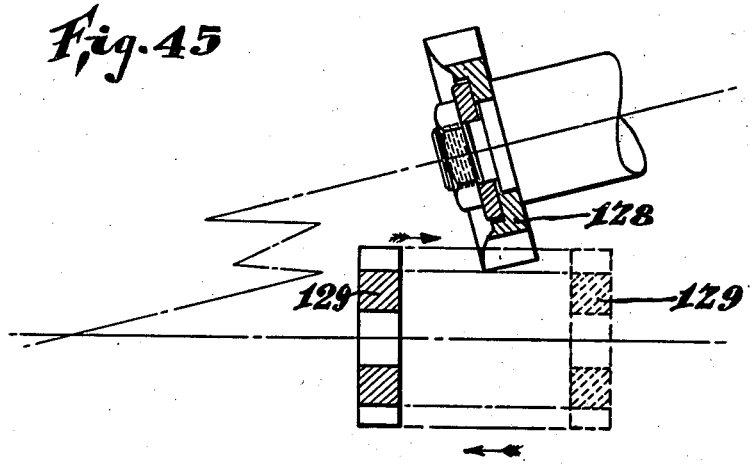
Fig. 45 is a diagrammatic view showing an advantageous application of a straight tooth hyperboloid face cutter.

An important advantage of a cutter having a high angle of undercut and geometrically correct cutting edges is that the teeth of the cutter may be made of uniform width and height throughout their length and will correctly generate involute gears with the axis of the cutter intersecting the axis of the gear blank at an angle as shown in Fig. 45, where a cutter 128, having teeth of uniform width and depth, is shown in generating position with respect to a gear blank 129, which may be moved relatively to the cutter from a position axially from the position shown in full line to a position shown in dotted line during each reciprocating stroke, while the gear and cutter are being rotated at the relative speeds determined by their tooth ratios.

An inherent disadvantage of helical tapered teeth gear shaped cutters such as heretofore universally used is that, as the front face is ground back in sharpening, the teeth become smaller and smaller, making it necessary to employ relatively narrow cutters with consequently shorter life. The cutter shown at 128 in Fig. 45 has the exact form of a gear conjugate to the gear to be generated and will have exactly the same generating action throughout its life, since the cutter may be ground back until it is so thin that the teeth no longer possess the necessary strength without in any way affecting the generating action of the cutter.

The method of the present invention is especially advantageous for helical cutters having relatively small, closely spaced teeth and produces cutters which have a very accurate generating action.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The herein described method of generating radial helicoid end faces on teeth of gear shaped cutters, which comprises positioning a line generatrix cutting element in spaced relation and disposed at an angle to the axis of the work with its line generatrix edge portion in engagement with an end face of a tooth of the work, imparting a rapid movement to the line generatrix cutting element and a slow turning movement to the work, to cause the line generatrix of engagement, between the cutting element and tooth of the work, to pass across and generate a radial helicoid on the face of the tooth.

2. The herein described method of generating radial helicoid end faces on teeth of gear shaped cutters, which comprises positioning a line generatrix cutting element in spaced relation and disposed at an angle to the axis of the work with its line generatrix edge portion in engagement with an end face of a tooth of the work, imparting a rapid movement to the line generatrix cutting element and slow oscillating and linear movements to the work with the linear movement of the work proportional to its axial movement, to cause the line generatrix of engagement, between the cutting element and tooth of the work, to pass across and generate a radial helicoid on the face of the tooth.

3. The herein described method of generating radial helicoid end faces on teeth of gear shaped cutters, which comprises positioning a rotary line generatrix cutting element with its axis spaced from and disposed at an angle to the axis of the work and its peripheral edge portion in engagement with an end face of a tooth of the work, imparting a rapid rotary movement to the cutting element and slow rotary and rectilinear movements to the work proportional to each other, to cause the generatrix line of engagement, between the cutting element and tooth of the work, to sweep across and simultaneously generate a radial helicoid on the face of the tooth.

4. The herein described method of generating end faces on the teeth of gear shaped cutters, which comprises positioning the conical surface of a rotary cutting element so that said surface tangentially contacts with a plane of the axis of the work normal to the plane of revolution of the work and with its axis spaced from and disposed at an angle to the axis of the work, with its peripheral line generatrix edge portion in engagement with an end face of a tooth of the work, imparting a rapid rotary movement to the conical cutting element and a slow turning movement to the work to cause the line generatrix of engagement between the cutting element and the end face of the tooth of the work to pass across said face.

5. The herein described method of generating end faces on teeth of gear shaped cutters, which comprises positioning the conical peripheral surface of a rotary cutting element so that said surface tangentially contacts with a plane of the axis of the work normal to the plane of revolution of the work and with its axis spaced from and disposed at an angle to the axis of the work equal to the helix angle of the work and with its peripheral line generatrix edge portion in engagement with an end face of a tooth of the work, and imparting a rapid rotary movement to the conical cutting element and a slow turning movement to the work to cause the line generatrix of engagement between the cutting element and the end face of the tooth of the work to pass across said face.

6. The herein described method of generating helicoid end faces on teeth of a gear shaped cutter which comprises positioning a rotary cutting element with its axis spaced from and angularly disposed to the axis of the cutter and with a peripheral edge of the cutting element in engagement with an end face of a cutter tooth, rapidly rotating the cutting element, slowly rotating the gear shaped cutter and simultaneously causing the cutting element to have a relative linear movement in a direction axially of the gear shaped cutter and in an amount corresponding to the lead of the generatrix of the helicoid face being generated.

7. The herein described method of generating the end faces of teeth of a gear shaped cutter which comprises positioning a rotary cutting element with its axis spaced from the axis of the gear shaped cutter and crossing the same at an angle and with a peripheral edge portion engaging a tooth face, the peripheral edge portion of the cutting element in engagement with the cutter being so short as to be substantially straight and disposed radially of the axis of the cutter, rapidly rotating the cutting element, slowly rotating the gear shaped cutter and simultaneously imparting a relative linear movement proportional to the angular movement of the gear shaped cutter between the gear shaped cutter and cutting element in a direction of the axis of the gear shaped cutter, whereby a radial helicoid is generated on the end face of a tooth.

8. Generating apparatus comprising a supporting frame, a turret mounted on said frame for adjustment about a vertical axis, a slide mounted for vertical adjustment on said turret, a cutter spindle mounted on said slide, means for driving said spindle, a slide mounted for horizontal adjustment on said frame laterally of the turret, a head mounted on said slide for movement laterally thereon, a work spindle journaled in said head, automatic means for oscillating the work spindle and for simultaneously reciprocating the same axially, and means for automatically indexing the work spindle.

9. Generating apparatus comprising a supporting frame, a turret mounted on said frame for adjustment about a vertical axis, a slide mounted for vertical adjustment on said turret, a cutter spindle mounted on said slide, means for driving said spindle, a supporting member mounted on the supporting frame laterally of the turret for angular adjustment about a horizontal axis, a slide mounted on said supporting member for adjustment along said axis, a head mounted on said slide for movement transversely thereof, a work spindle journaled in said head, means for oscillating said work spindle and for simultaneously reciprocating the same axially, and means for indexing the work spindle during a portion of each reciprocating stroke.

10. Generating apparatus comprising a work spindle, a support for the work spindle adjustable angularly about an axis transverse to the work spindle and linearly in a direction parallel to said pivotal axis, automatic means for oscillating said spindle and for simultaneously reciprocating the same with a linear speed at a fixed ratio to the angular speed thereof, a cutter spindle having a generating element thereon engageable with a workpiece on the work spindle during a portion of the reciprocating and oscillating stroke thereof, a support for the cutter spindle adjustable angularly about an axis transverse to its own axis and to the axis of the work spindle, said cutter spindle support being also adjustable linearly in the direction of its pivotal axis, and means for automatically indexing the work spindle during intervals in which the workpiece and generating element are disengaged.

11. The herein described method of generating hyperboloid end faces on the teeth of a straight tooth gear shaped cutter which comprises positioning a grinding wheel relative to the face of the cutter such that it has a line cutting engagement therewith that is tangential to the base circle of the cutter while said wheel is disposed at a reentrant angle with respect to the cutter face, rapidly rotating the grinding wheel, and simultaneously imparting a slow turning movement to the cutter to cause the line of engagement between the wheel and the tooth face to pass across said face.

OLIVER G. SIMMONS.